Sept. 28, 1937.  R. I. SCHONITZER  2,094,413
DOOR CONTROL MECHANISM
Filed Aug. 20, 1937   13 Sheets-Sheet 1
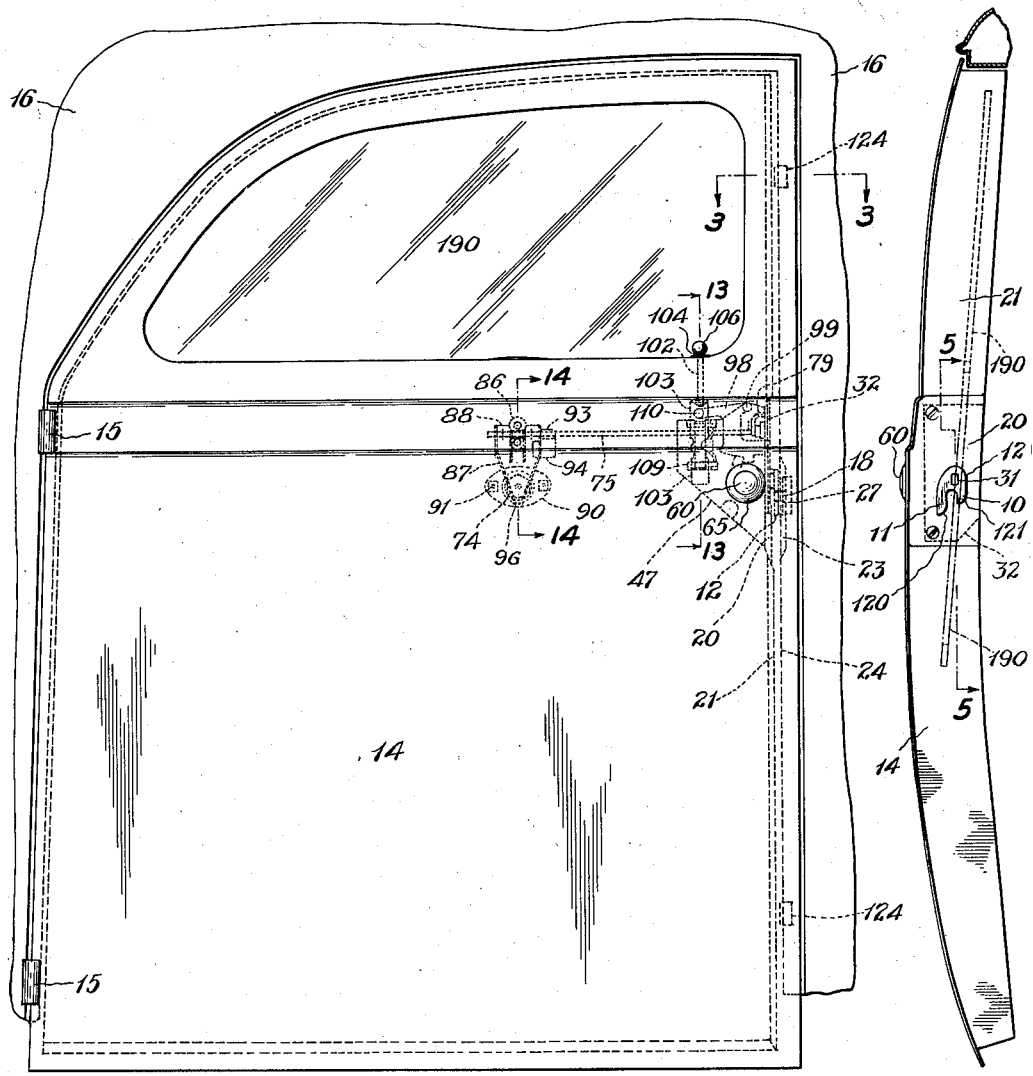
FIG. 1.
FIG. 2.
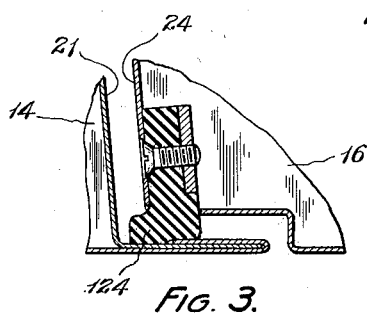
FIG. 3.
INVENTOR:
RUDOLPH I. SCHONITZER
BY Brockett, Hyde, Higley & Meyer
ATTORNEYS.

Sept. 28, 1937.  R. I. SCHONITZER  2,094,413
DOOR CONTROL MECHANISM
Filed Aug. 20, 1937  13 Sheets-Sheet 2

INVENTOR:
RUDOLPH I. SCHONITZER
BY Brockett, Hyde, Higley & Meyer
ATTORNEYS

Sept. 28, 1937.  R. I. SCHONITZER  2,094,413
DOOR CONTROL MECHANISM
Filed Aug. 20, 1937  13 Sheets-Sheet 3

INVENTOR:
RUDOLPH I. SCHONITZER
BY Brockett, Hyde, Higley & Meyer
ATTORNEYS.

Sept. 28, 1937.   R. I. SCHONITZER   2,094,413
DOOR CONTROL MECHANISM.
Filed Aug. 20, 1937   13 Sheets-Sheet 4

INVENTOR:
RUDOLPH I. SCHONITZER
BY Brockett, Hyde, Higley & Meyer
ATTORNEYS.

Sept. 28, 1937.  R. I. SCHONITZER  2,094,413
DOOR CONTROL MECHANISM
Filed Aug. 20, 1937  13 Sheets-Sheet 5
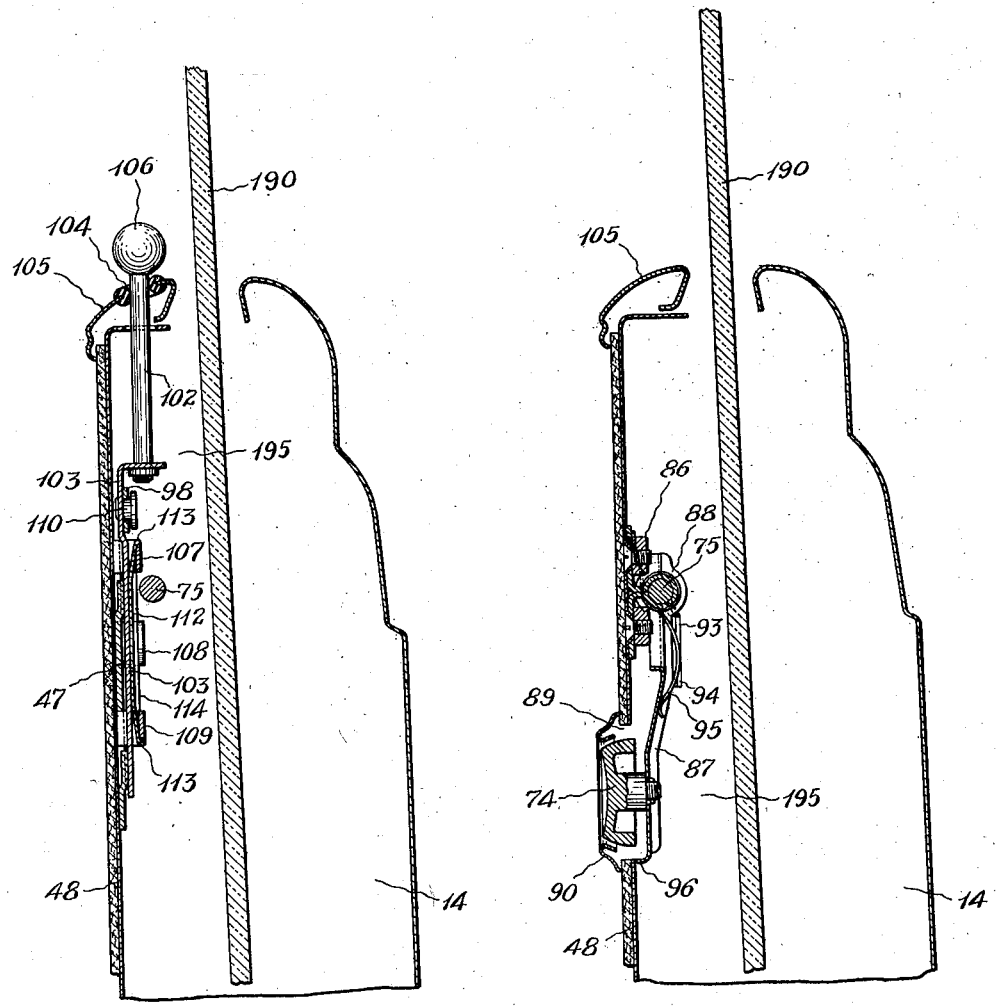
Fig. 13.  Fig. 14.
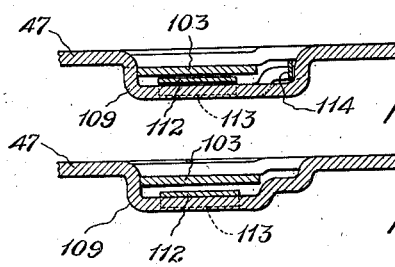
Fig. 15.
Fig. 16.
INVENTOR:
RUDOLPH I. SCHONITZER.
BY Brockett, Hyde, Higley & Meyer
ATTORNEYS.

Sept. 28, 1937.  R. I. SCHONITZER  2,094,413
DOOR CONTROL MECHANISM
Filed Aug. 20, 1937   13 Sheets-Sheet 6

INVENTOR:
RUDOLPH I. SCHONITZER
BY Brockett, Hyde, Higley & Meyer
ATTORNEYS.

Sept. 28, 1937. R. I. SCHONITZER 2,094,413
DOOR CONTROL MECHANISM
Filed Aug. 20, 1937 13 Sheets-Sheet 7
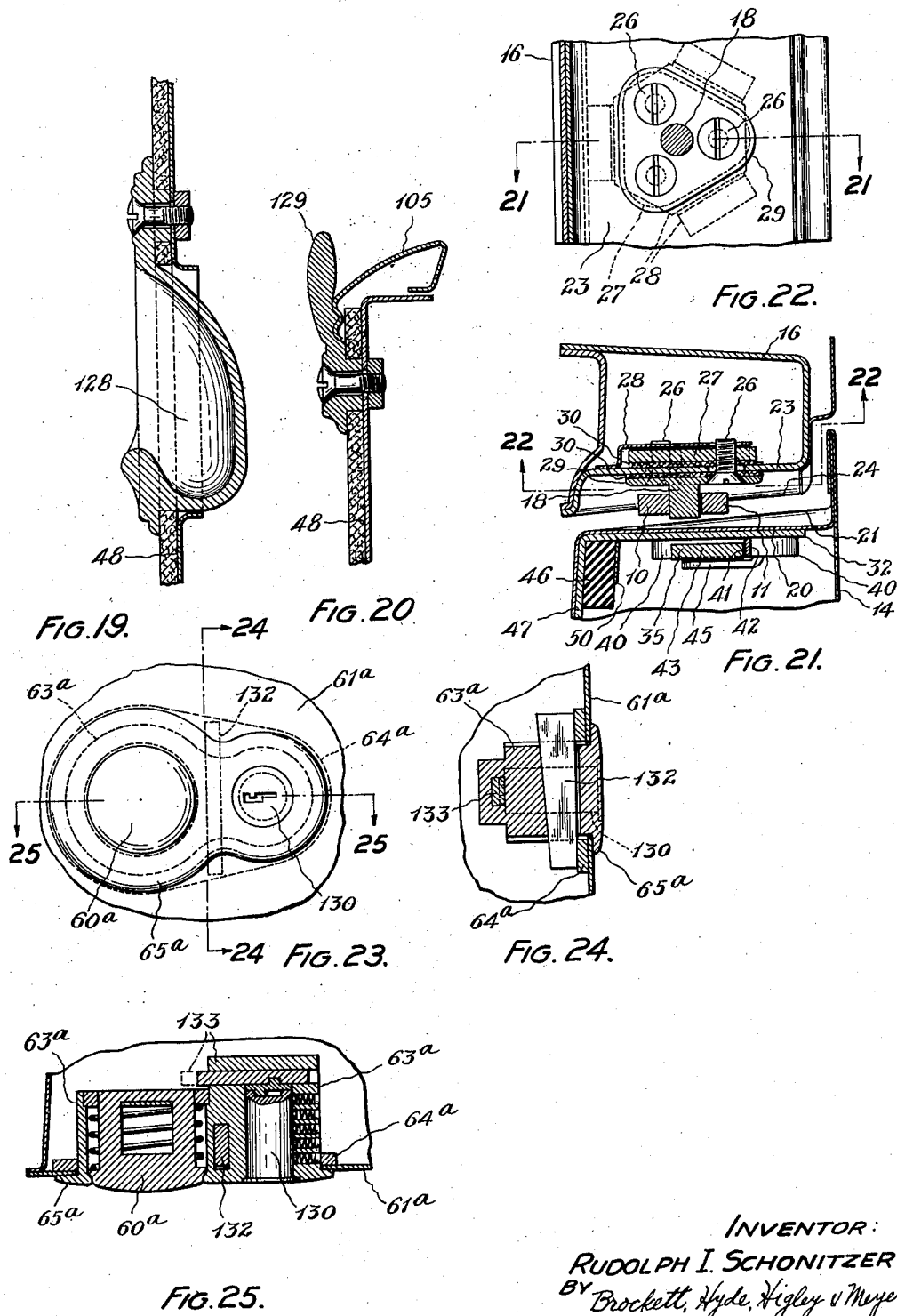
INVENTOR:
RUDOLPH I. SCHONITZER
BY Brockett, Hyde, Higley v Meyer
ATTORNEYS.

INVENTOR:
RUDOLPH I. SCHONITZER
BY Brockett, Hyde, Higley & Meyer
ATTORNEYS

Sept. 28, 1937.    R. I. SCHONITZER    2,094,413
DOOR CONTROL MECHANISM
Filed Aug. 20, 1937    13 Sheets-Sheet 9

INVENTOR:
RUDOLPH I. SCHONITZER
BY Brockett, Hyde, Higley & Meyer
ATTORNEYS.

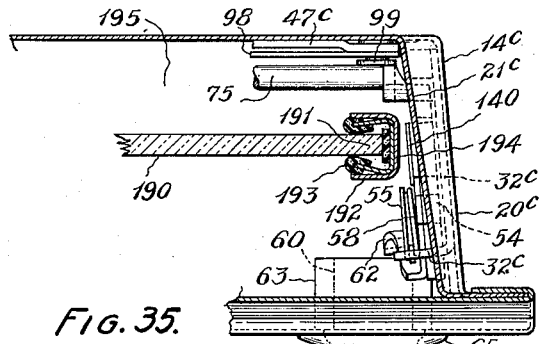
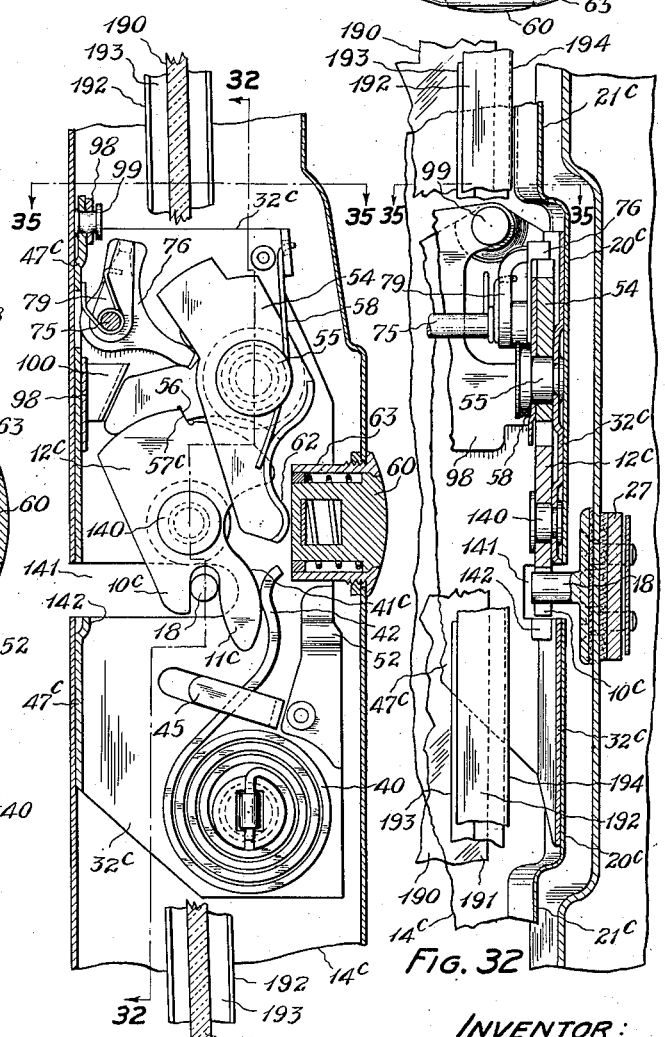
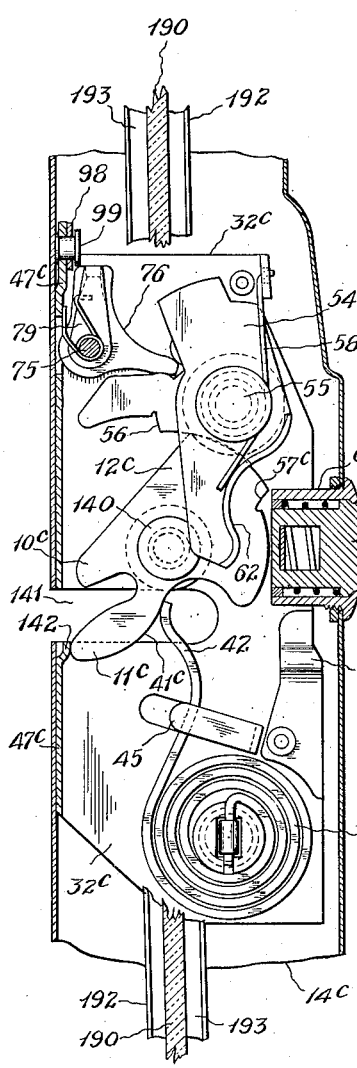

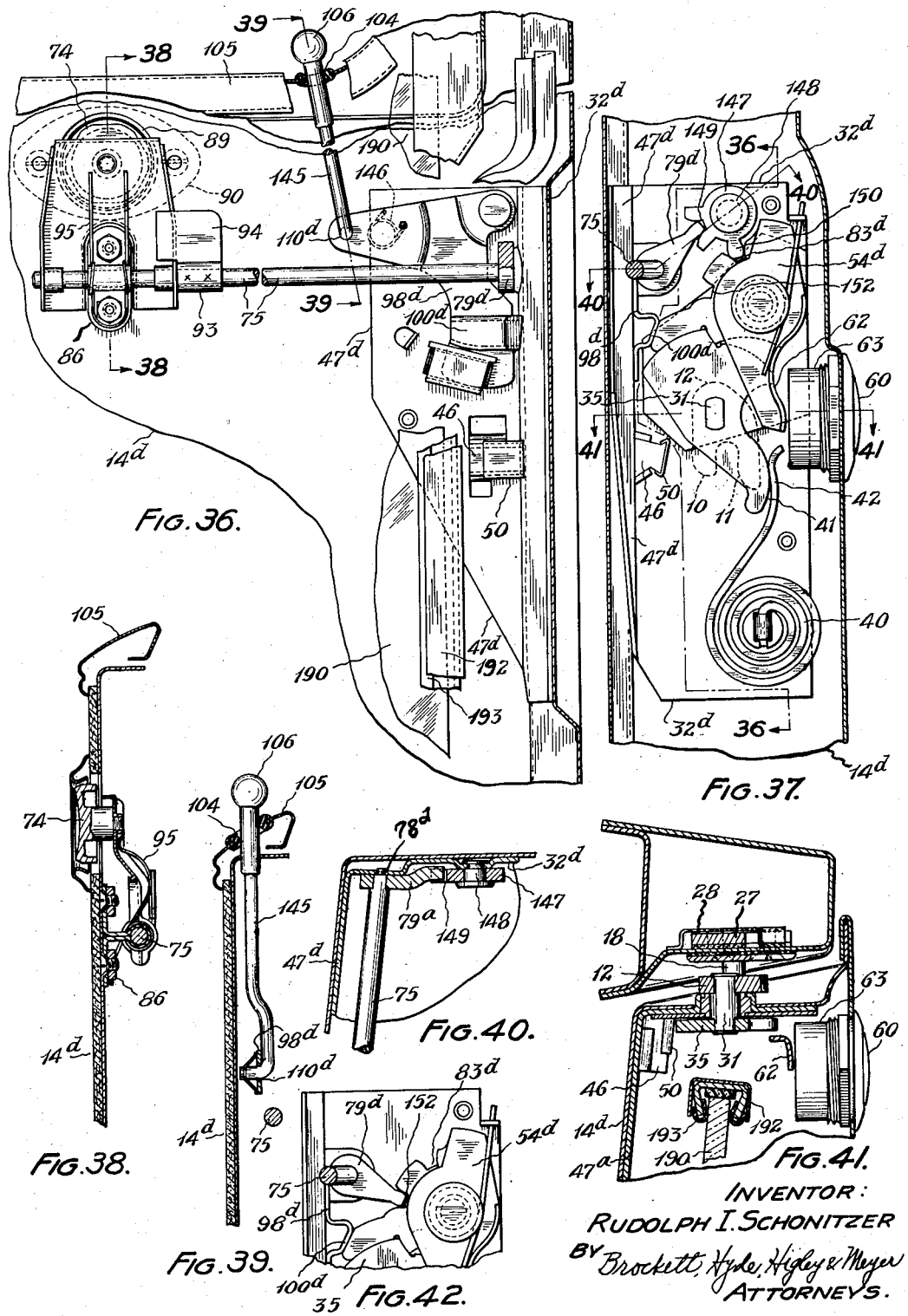

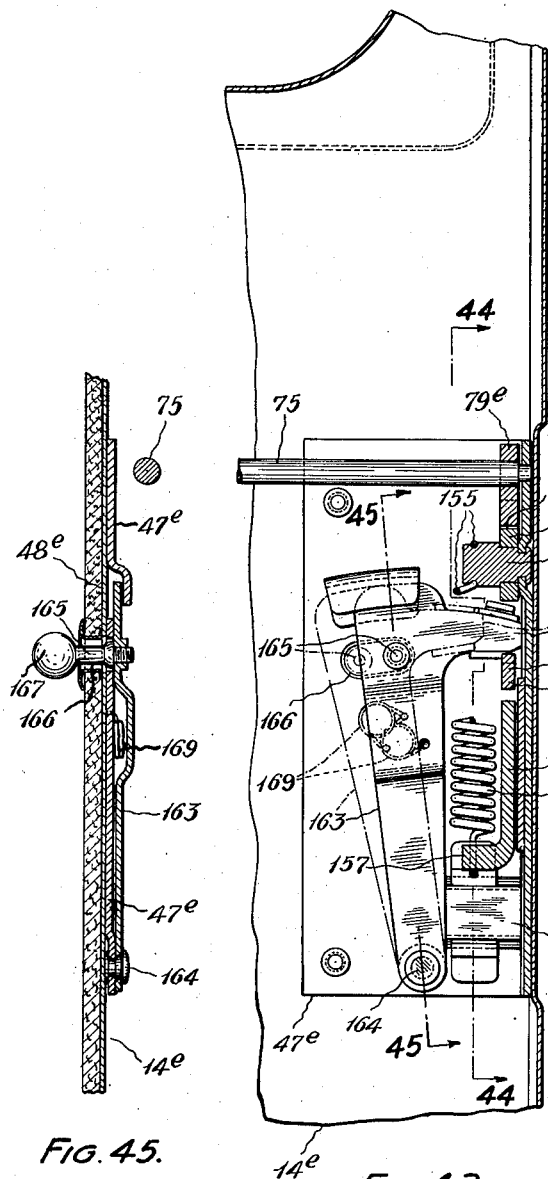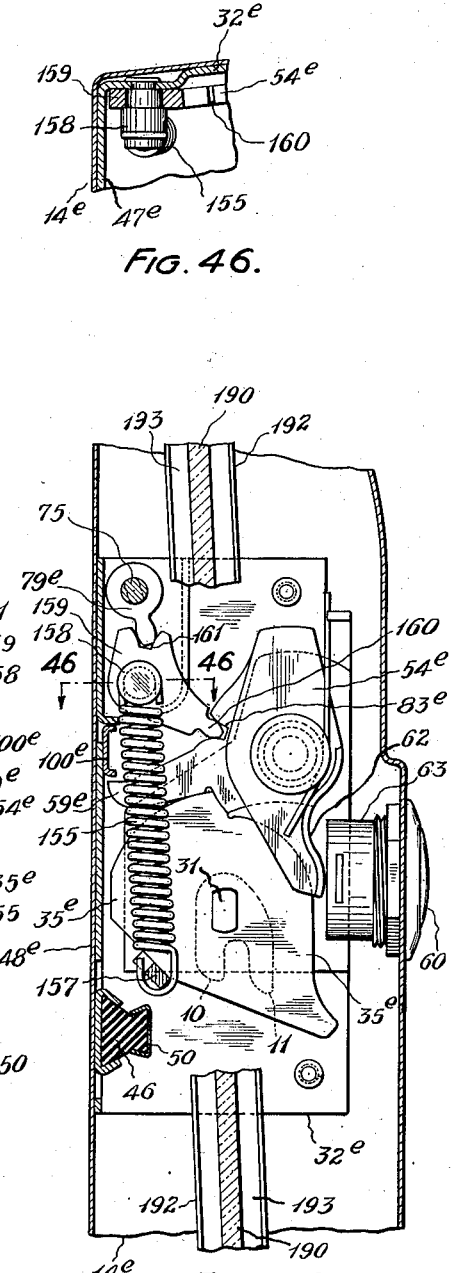
FIG. 45. FIG. 43. FIG. 44. FIG. 46.

Sept. 28, 1937.  R. I. SCHONITZER  2,094,413
DOOR CONTROL MECHANISM
Filed Aug. 20, 1937   13 Sheets—Sheet 13

INVENTOR:
RUDOLPH I. SCHONITZER
BY Brockett, Hyde, Higley & Meyer
ATTORNEYS.

Patented Sept. 28, 1937

2,094,413

UNITED STATES PATENT OFFICE 2,094,413

DOOR CONTROL MECHANISM

Rudolph I. Schonitzer, Shaker Heights, Ohio

Application August 20, 1937, Serial No. 160,025

27 Claims. (Cl. 292—216)

This invention relates to door control mechanism, the door control provided by the mechanism embodying such invention being a latch control, a throw-out control or a combined latch and throw-out control, all as will hereinafter more fully appear.

Although the present invention is applicable for use with the doors of various structures, such as with the doors of refrigerators and with the doors of various kinds of buildings, the present invention is particularly applicable for use with the doors of automobiles, inasmuch as mechanism embodying such invention preferably is of such character that it may be readily and conveniently associated with an edge wall of such a door without interfering in any way with the movable window pane with which such a door is provided, a window pane which is movable in said door into close proximity with that section of the door edge wall with which said mechanism is associated.

The present invention has for its general object the provision of door control mechanism which is of simple and inexpensive construction; which comprises readily and conveniently assembled parts of strong and sturdy character; and which efficiently and positively provides the door control desired, whether that control be a latch control, a throw-out control or a combined latch and throw-out control, as heretofore referred to.

A specific object of the present invention is the provision of simple and inexpensive door control mechanism, for effecting in an efficient and positive manner, the releasable latching of a door in closed position whenever it is moved thereto and the unlatching of said door when desired.

Another specific object of the present invention is the provision of simple and inexpensive door control mechanism, for effecting in an efficient and automatic manner, the throwing of a closed door to at least partially open position whenever it is free for such opening movement, such as upon the unlatching thereof, the extent of such automatic opening movement of said door being at least sufficient to enable the free edge portion of said door to be conveniently grasped to manually effect further opening movement of said door.

Another specific object of the present invention is the provision of simple and inexpensive door control mechanism, for effecting in an efficient and positive manner, the latching and unlatching of a door and the automatic throwing of such door to at least partially open position upon the unlatching thereof.

Another specific object of the present invention is the provision of simple and inexpensive door control mechanism which includes improved detent means for releasably detaining in operative position, when the door with which such mechanism is used is closed, the door control arm means of such mechanism, said arm means being ready when in such operative position for door unlatching movement or door throw-out movement or for both of such movements, as will hereinafter more fully appear.

Another specific object of the present invention is the provision of simple and inexpensive door control mechanism which includes two manually operable push members, such as push buttons, for the mechanical actuation of the detent means of such mechanism and the consequent release of the door control arm means thereof when the door with which such mechanism is used is closed, said push buttons being located on opposite sides of and normally being substantially flush with said door or with the adjacent body or frame structure. As a result, the actuation of said detent means and the release of said arm means may be easily and conveniently effected from either the outer or the inner side of said door or said frame structure, and without the necessity of providing said door with the projecting and undesirable handles which even present day automobile door locks still require.

Another specific object of the present invention is the provision of simple and inexpensive door control mechanism which includes an outside key-actuated lock for effectively preventing unauthorized operation of the outside push button of said mechanism and also, improved manually operable inside restraining means for effectively preventing undesired release operation of the detent means of such mechanism when the door with which such mechanism is used is closed. Therefore, by the manual operation of either said outside lock or said inside restraining means, the two push buttons of such mechanism are rendered wholly ineffective to release the door control arm means of such mechanism and hence ineffective to bring about either the unlatching of said door or outward throwing or opening movement thereof, all as will hereinafter more fully appear.

Further objects of the present invention and the nature of several embodiments thereof, will be readily apparent from the following description of the invention, reference being had to the accompanying drawings, in which Figs. 1 to 22 inclusive and Figs. 26 to 28 inclusive illustrate latch and throw-out control mechanism embodying one form of the present invention, as used with a left-side automobile door, Fig. 1 being an elevation of the outer side of such a door and an adjacent portion of the automobile body, the door being closed and latched;

Fig. 2 is an elevation of the free edge wall of such door, from the outside thereof, with the door control arm means of such mechanism in operative position and with a portion of the automobile body above the door shown in section;

Fig. 3 is a detail cross-sectional view partly through the automobile door and body and showing one of the door-engaging bumper members with which the body is provided, the view being on the line 3—3, Fig. 1;

Figure 4:
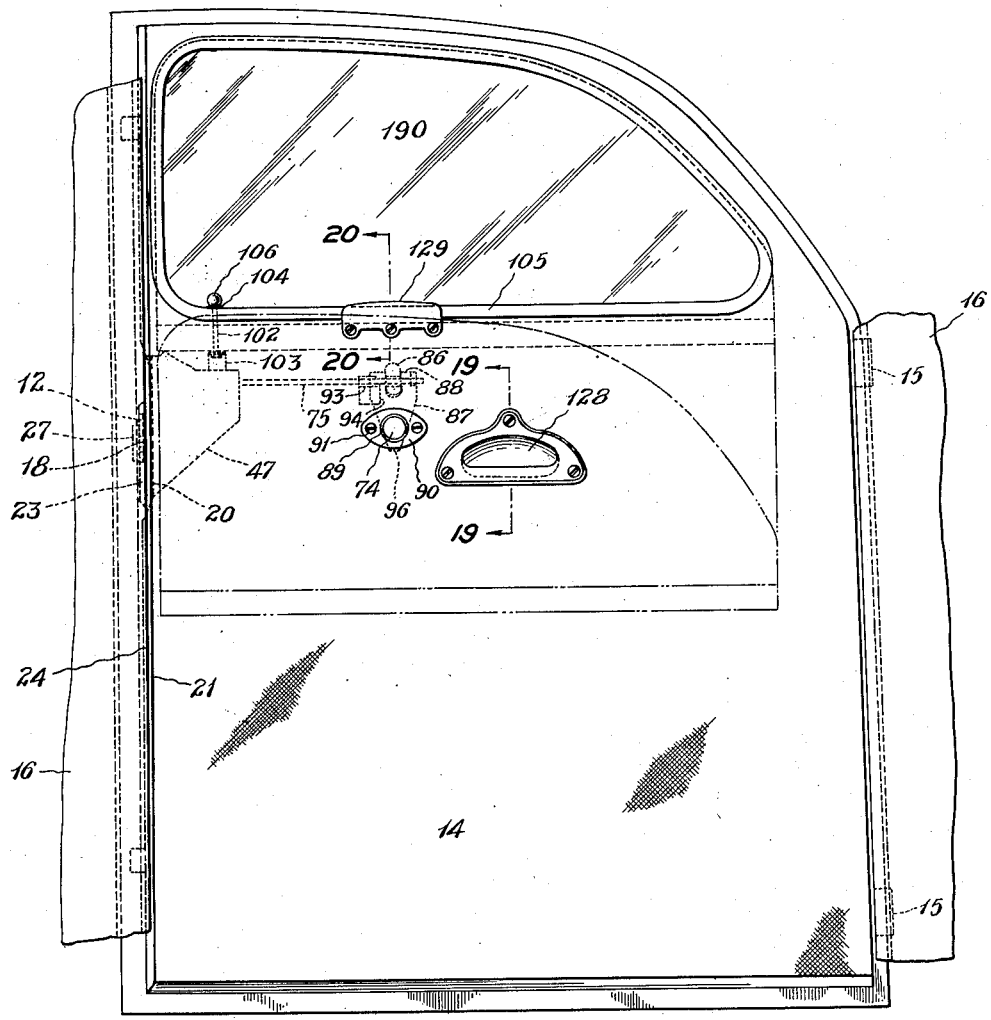
Fig. 4 is an elevation of the inner side of such closed and latched door and two adjacent portions of the automobile body.
Figure 6:
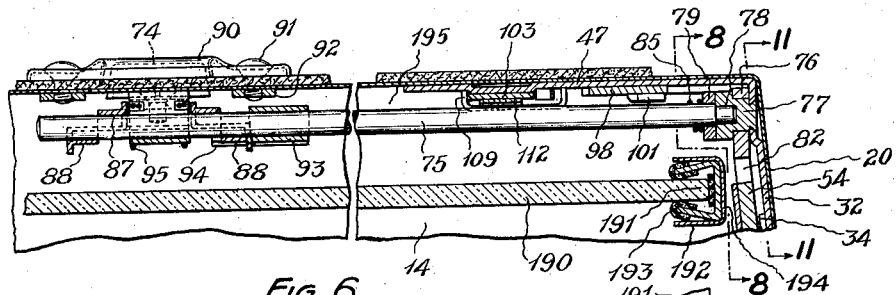
Fig. 6 is a cross-sectional view partly through the automobile door, the view being on the line 6—6, Figs. 6 and 8.
Figure 5:
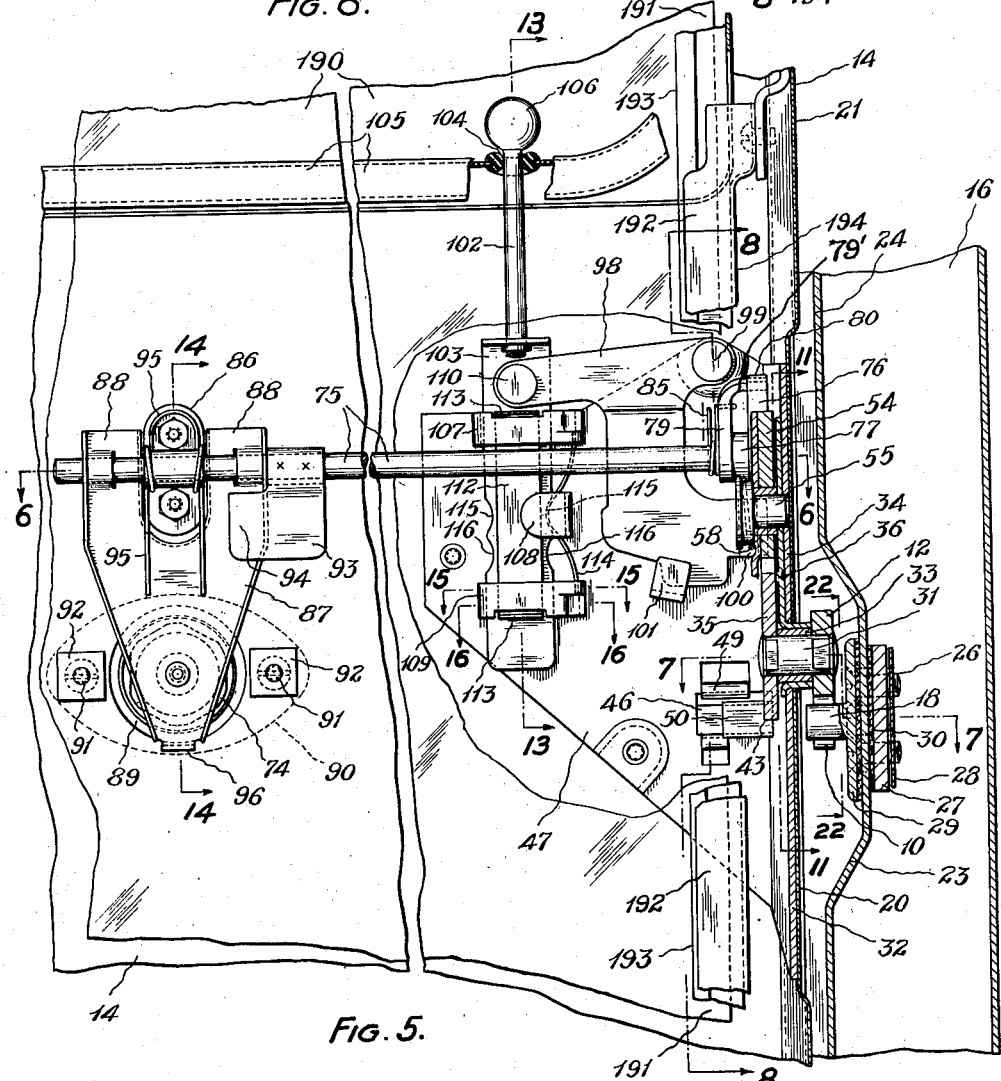
Fig. 5 is an enlarged fragmentary vertical sectional view longitudinally through portions of the automobile door and body, the view being on the line 5—5 of Figs. 2, 7, and 8, and the door being closed and latched and the inside restraining means of the mechanism being in restraining position.
Figure 9:
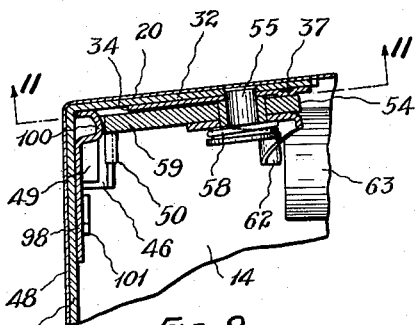
Figure 10:
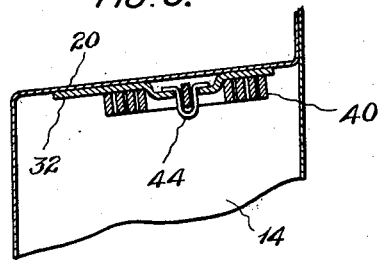
Figure 8:
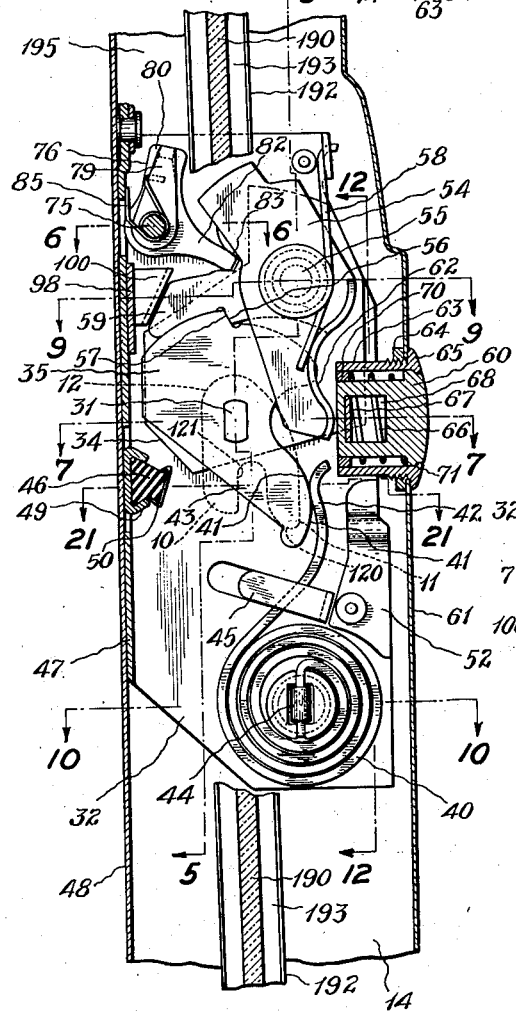
Fig. 8 is a vertical sectional view transversely through a portion of the closed and latched door, the view being on the line 8—8, Figs. 5, 6, and 7, and the restraining means of the mechanism being in restraining position.
Figures 11, 12:
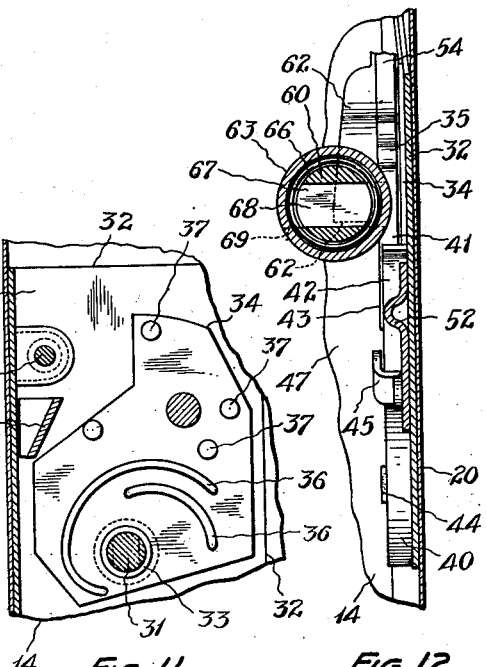
Figures 17, 18:
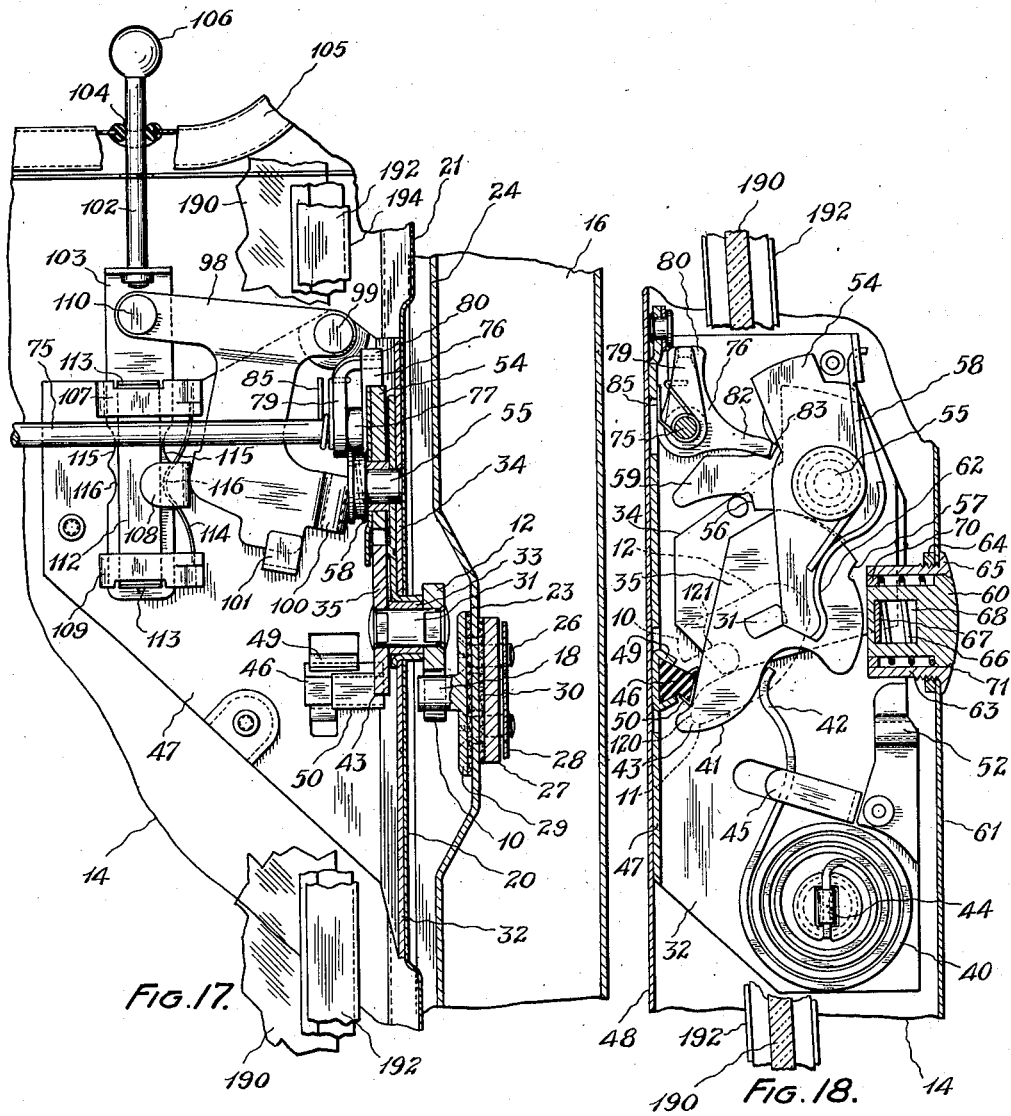
Figure 26:
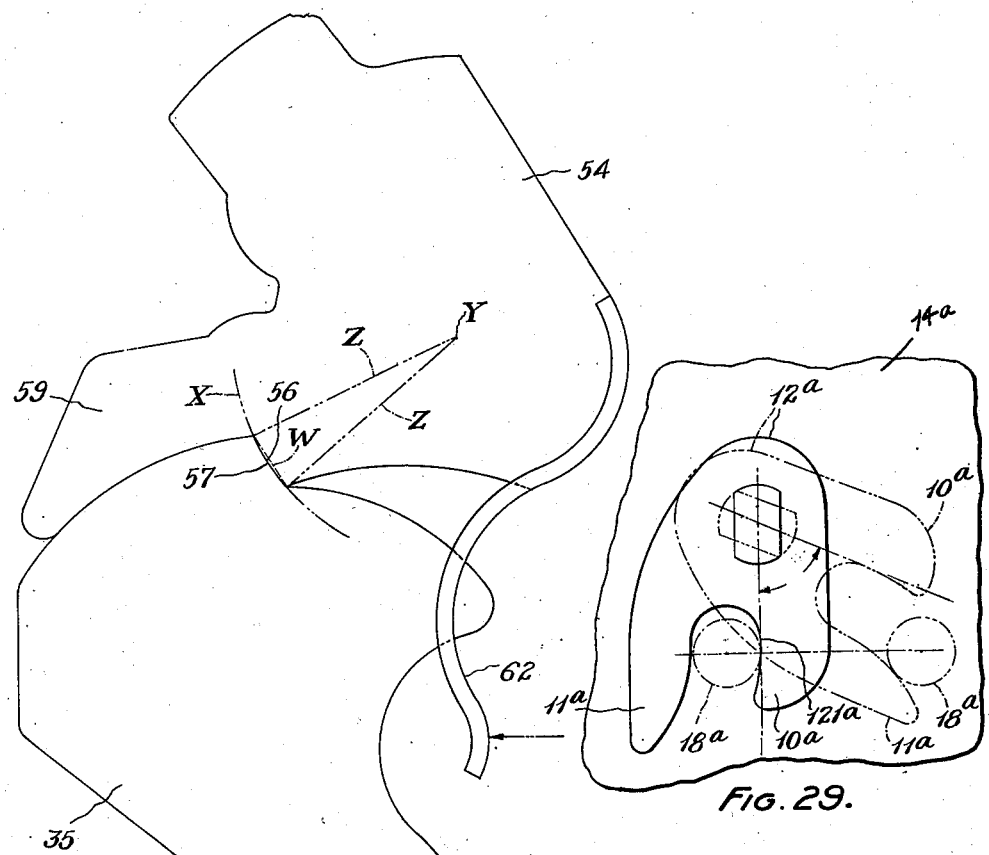
Figure 29:
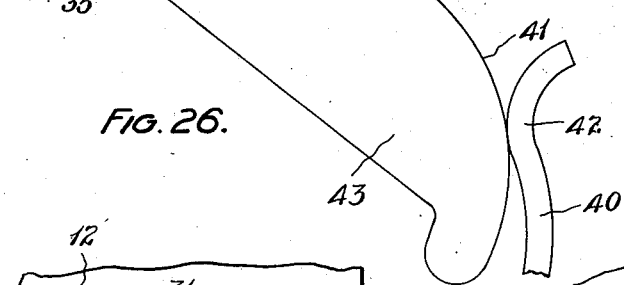
Figure 28:
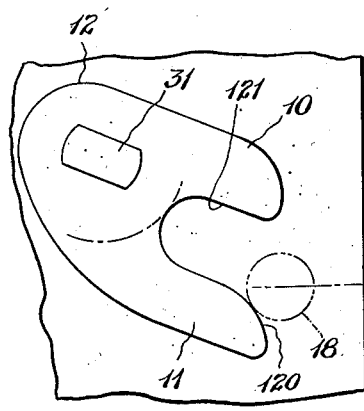
Figure 27:
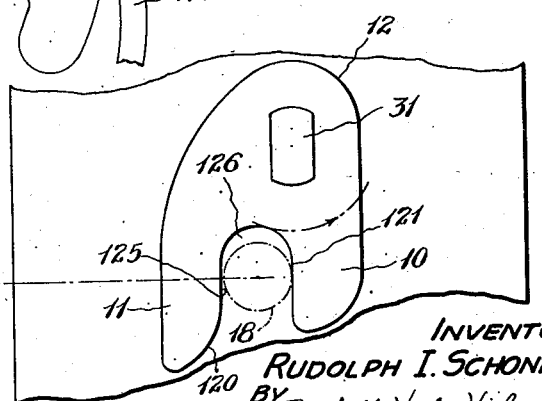
Figure 30:
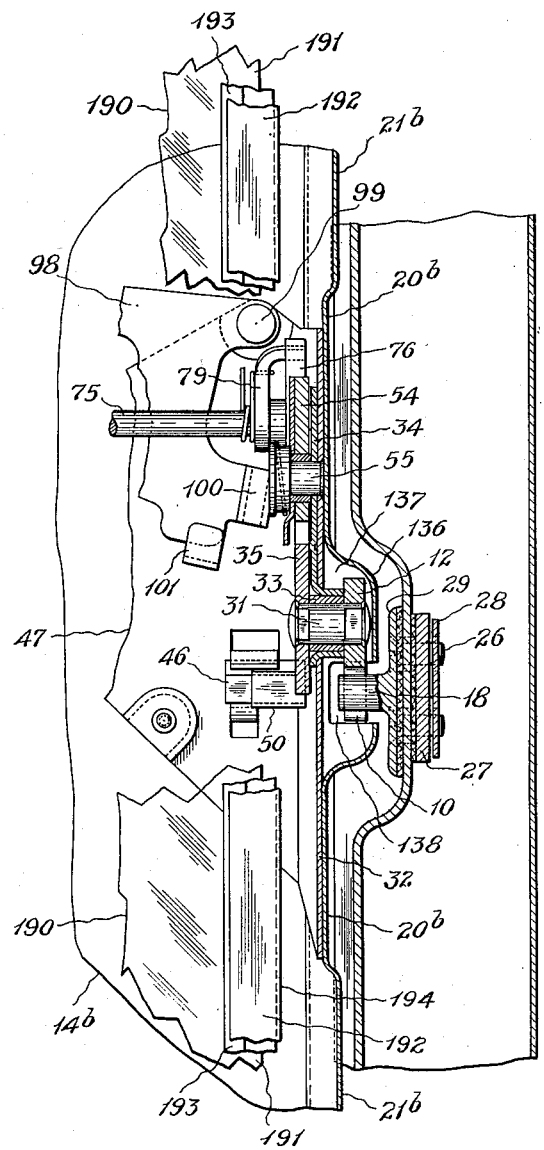
Figure 31:
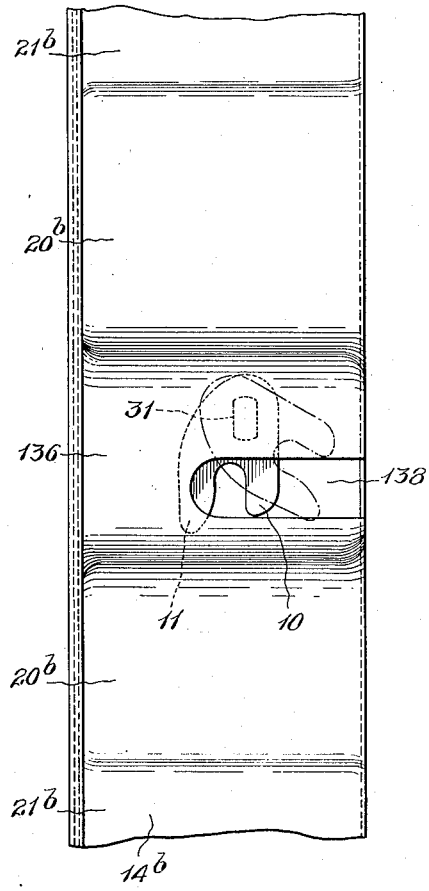
Figures 47, 48, 49:
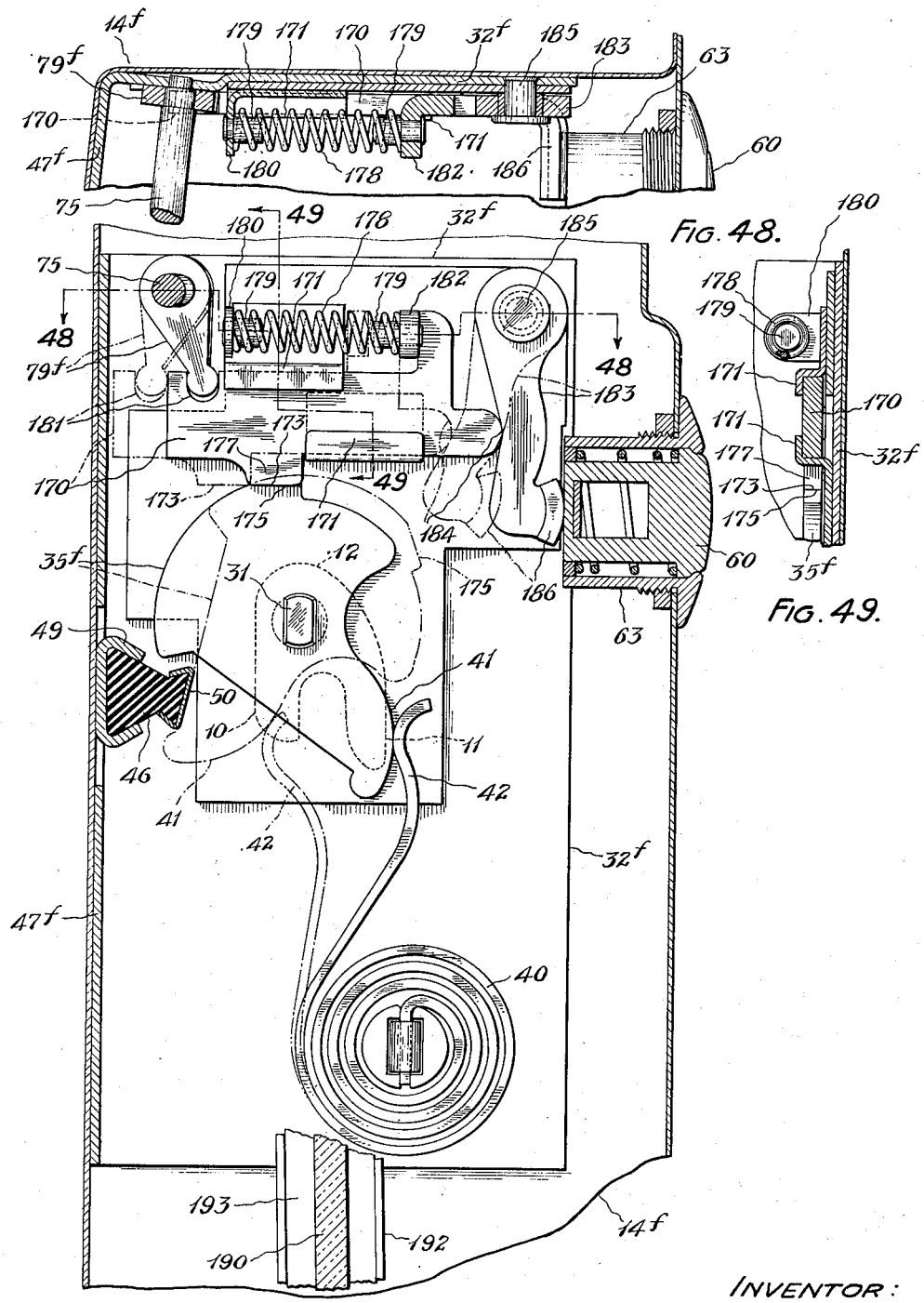

Figs. 9 and 10 are detail cross-sectional views through portions of the automobile door, the views being on the lines 9—9 and 10—10, Fig. 8, respectively;

Fig. 11 is a detail vertical sectional view transversely through a portion of the automobile door, the view being on the line 11—11, Fig. 9;

Fig. 12 is a detail vertical sectional view longitudinally through a portion of the automobile door, the view being on the line 12—12, Fig. 8;

Fig. 13 is a vertical sectional view transversely through the automobile door, the view being on the line 13—13, Fig. 5, and showing portions of the inside restraining means of the mechanism;

Fig. 14 is a vertical sectional view transversely through the automobile door, the view being on the line 14—14, Figs. 1 and 5 and showing portions of the inside manually operable means for the release actuation of the detent means of the mechanism;

Figs. 15 and 16 are detail cross-sectional views of the inside restraining means of such mechanism, the views being on the lines 15—15 and 16—16, Fig. 5, respectively;

Fig. 17 is a view similar to Fig. 5 but showing the inside restraining means out of restraining position;

Fig. 18 is a view similar to Fig. 8 but showing the parts of the mechanism in the positions which they occupy when the automobile door is open;

Figs. 19 and 20 are vertical sectional views of two means which may be used in manually pulling the automobile door from open to closed position, the views being on the lines 19—19 and 20—20, Fig. 4, respectively;

Fig. 21 is a cross-sectional view through portions of the automobile door and body, the view being on the line 21—21, Fig. 8;

Fig. 22 is a detail vertical sectional view, on the line 22—22, Fig. 21;

Figs. 23 to 25 inclusive are views of a combined push button and key-actuated lock structure which mechanism embodying the present invention may utilize, Fig. 23 being an elevation of such a structure and a portion of the automobile door or body with which it may be associated;

Figs. 24 and 25 are detail sectional views of such button and lock structure, on the lines 24—24 and 25—25, Fig. 23, respectively;

Fig. 26 is an enlarged diagrammatic view of certain parts of the mechanism of Figs. 1 to 22 inclusive, in which view certain relationships of such parts are more clearly illustrated;

Figs. 27 and 28 are enlarged views, more or less diagrammatic in form and showing the movement of the door control arm means of the mechanism here illustrated in the automatic throwing of an automobile door to at least partially open position, the door in Fig. 27 being closed and latched and the door in Fig. 28 being partially open;

Fig. 29 is a view similar to Fig. 27 and showing a modified form of door control arm means;

Figs. 30 and 31 illustrate latch and throw-out control mechanism embodying a second form of the present invention, as used with an automobile door, Fig. 30 being a vertical sectional view corresponding in part to Fig. 5 and showing only those parts of this second form of mechanism which are necessary for a proper understanding thereof, and Fig. 31 being an elevation of the outer side of that section of the automobile door free edge wall which is shown in Fig. 30;

Figs. 32 to 35 inclusive illustrate latch and throw-out control mechanism embodying a third form of the present invention, as used with an automobile door, Fig. 32 being a vertical sectional view corresponding in part to Fig. 5 and showing only those parts of the mechanism constituting this third embodiment which are necessary for a proper understanding thereof;

Fig. 33 is a vertical transverse sectional view, corresponding to Fig. 8 but showing the mechanism of this third form, the automobile door being closed and latched and the restraining means of the mechanism being in restraining position;

Fig. 34 is a view corresponding in part to Fig. 33 but showing the parts of the mechanism of this third form in the positions which such parts occupy when the automobile door is open;

Fig. 35 is a view corresponding in part to Fig. 6 and showing only those parts of the mechanism of this third form which are necessary for a proper understanding thereof;

Figs. 36 to 41 inclusive illustrate latch and throw-out control mechanism embodying a fourth form of the present invention, as used with an automobile door, Figs. 36 and 37 being views corresponding in part to Figs. 5 and 8, respectively, and showing only those parts of this fourth form of mechanism which are necessary for a proper understanding thereof;

Fig. 38 is a vertical sectional view of the inside push button and some of its associated parts, as used in the mechanism of this fourth form, the view being on the line 38—38, Fig. 36;

Fig. 39 is a vertical sectional view of parts of the inside restraining means of this fourth form of mechanism, the view being on the line 39—39, Fig. 36; and Figs. 40 and 41 are detail cross-sectional views of this fourth form of mechanism, the views being on the lines 40—40 and 41—41, Fig. 37, respectively;

Fig. 42 is a detail vertical sectional view, corresponding in part to the upper portion of Fig. 37 and showing the rod finger directly connected with the detent member, as used when the inside push button is positioned below said rod;

Figs. 43 to 46 inclusive illustrate latch and throw-out control mechanism embodying a fifth form of the present invention, as used with an automobile door, Figs. 43 and 44 corresponding in part to Figs. 5 and 8 and showing only those parts of this fifth form of mechanism which are necessary for a proper understanding thereof;

Fig. 45 is a vertical sectional view of parts of the inside restraining means of this fifth form of mechanism, the view being on the line 45—45, Fig. 43; and Fig. 46 is a detail cross-sectional view on the line 46—46, Fig. 44; and Figs. 47 to 49 inclusive illustrate latch and throw-out control mechanism embodying a sixth form of the present invention, as used with an automobile door, Fig. 47 being a vertical transverse sectional view corresponding in part to Fig. 8 and showing only those parts of this sixth form of mechanism which are necessary for a proper understanding thereof; and Figs. 48 and 49 are detail sectional views of this sixth form of mechanism, the views being on the lines 48—48 and 49—49, Fig. 47, respectively.

Before the present invention is described in detail, it is to be understood that such invention is not limited to the details of construction and/or the specific arrangement of parts herein illustrated and/or described, as the invention obviously may take other forms. It also is to be understood that the phraseology or terminology herein employed is for the purpose of description and not of limitation, there being no intention and no desire to limit the present invention, as herein disclosed and as defined in the appended claims, beyond the requirements of the prior art.

As heretofore pointed out, the present invention is applicable for use with the doors of various structures, but said invention is particularly applicable for use with the doors of modern day automobiles. For purposes of illustration and not of limitation, therefore, use of the present invention with automobile doors is here shown and described.

Although the door control provided by the present invention may be a latch control only, or a throw-out control only, or a combined latch and throw-out control, as will hereinafter more fully appear, the accompanying drawings show, solely for purposes of illustration, embodiments of the invention which provide a combined door latch and door throw-out control. However, as will later be explained, the mechanisms constituting such embodiments may be readily modified, in an exceedingly simple and inexpensive manner, to provide a latch control only or a throw-out control only, if either of such types of control alone is desired.

Referring first to that embodiment of the invention illustrated in Figs. 1 to 22 inclusive and in Figs. 26 to 28 inclusive, it will be noted that the mechanism constituting such embodiment includes a door latching and unlatching arm 10 (hereinafter for convenience termed a "latch arm"), and a door throw-out arm 11, said arms being either separate members or, as here shown, integral parts of a generally flat bifurcated member 12. For cooperation with said arms in the control of the automobile door 14, which is a left-side door having its front edge portion hinged at 15 to the automobile body or frame structure 16, any suitable means may be utilized, the means here shown being a simple pin or stud member 18 (hereinafter for convenience termed a "keeper pin"). Although either said arms or said keeper pin may be associated with the automobile door and the other associated with the automobile body, in the embodiments of the invention here illustrated the latch and throw-out arms are associated with automobile doors and the keeper pins associated with the automobile bodies. In this first form of the invention, namely, in that embodiment illustrated in Figs. 1 to 22 inclusive and in Figs. 26 to 28 inclusive, the latch and throw-out arms 10 and 11 are associated with the automobile door 14, adjacent a section 20 of its free edge wall 21, and the keeper pin 18 is associated with the automobile body 16, adjacent a section 23 of its edge wall 24, said door edge wall 21 and said body edge wall 24 being adjacent, and the sections 20, 23 thereof being in horizontal alignment, when the door is in closed position.

Instead of being associated with the free edge wall of the automobile door 14, as here shown, the latch and throw-out arms 10 and 11 (or the keeper pin 18) may be associated, if desired, with other portions of said door, and the keeper pin 18 (or said latch and throw-out arms) associated with other portions of the automobile body 16, as will be readily understood.

In the embodiment of the invention illustrated in Figs. 1 to 22 inclusive and Figs. 26 to 28 inclusive, (and in those embodiments thereof illustrated in Figs. 36 to 42 inclusive, in Figs. 43 to 46 inclusive, and in Figs. 47 to 49 inclusive), the latch and throw-out arms are located outside of the automobile doors with which such arms are associated, but such arms may be located, if desired, inside of such doors or such arms may be otherwise suitably covered or enclosed. As will hereinafter appear, in the embodiments of the invention illustrated in Figs. 30 and 31 and in Figs. 32 to 35 inclusive, the latch and throw-out arms are located inside the automobile doors with which they are associated.

In the use of an outside location for the latch and throw-out arms, the automobile door and body edge wall sections to which such arms and the keeper pin 18 are adjacent may be oppositely offset, to provide sufficient space for such arms and such keeper pin and yet maintain the normal and more limited spacing between the other sections of such door and body edge walls. As clearly shown in Figs. 5 and 7, the door edge wall section 20 and the body edge wall section 23 are offset in such manner, the two edge wall recesses formed thereby together providing ample space for the latch and throw-out arms 10 and 11 and for the keeper pin 18.

Any suitable means may be utilized in securing the keeper pin 18 to the offset section 23 of the body edge wall 24, with the longitudinal axis of said keeper pin substantially horizontal and substantially parallel with the side walls of the automobile door 14. Although the keeper pin utilized with the present invention may be of such construction and its securement to the body edge wall section 23 of such character that it is free to rotate about its substantially horizontal longitudinal axis, a simple pin or stud member is quite satisfactory, such as the one here shown which is rigidly secured to such body edge wall section 23. Such rigid securement of said keeper pin is here effected by the use of screws 26 and an anchor plate 27, (see Figs. 21 and 22), said anchor plate being carried inside the automobile body and in contact with the inner surface of its edge wall section 23 by a chambered sheet metal housing member 28 welded or otherwise rigidly secured to such body edge wall section. The keeper pin here shown has a suitable base portion 29 of integral form, and the screws 26 extend through suitable openings in such keeper pin base portion, the body edge wall section 23, the anchor plate 27 and the housing member 28, the openings in said anchor plate being threaded so that said body edge wall section may be securely clamped between said keeper pin base portion and said anchor plate. If desired and as here shown, fibrous insulating members 30 or the like may be interposed, for sound-deadening purposes, between said keeper pin base portion 29 and said body edge wall section 23 and between such section and the anchor plate 27, all as clearly shown in Figs. 21 and 22, for example. In order to enable the location of the keeper pin to be slightly varied, to compensate for variations in automobile doors and in the hanging thereof, the anchor plate 27 has limited edgewise movement in its housing member 28, and the openings in the body edge wall section 23 and in said housing member are, therefore, of somewhat larger size than that of the threaded shanks of the screws 26, as shown.

In this first embodiment of the present invention, namely, in that one illustrated in Figs. 1 to 22 inclusive and in Figs. 26 to 28 inclusive, the bifurcated member 12, of which the latch and throw-out arms 10 and 11 are integral parts, is mounted on the outer end portion of a relatively short stub shaft 31, for which shaft any suitable support may be utilized, the support 32 here shown for such shaft being of plate-like form and, for convenience, is hereinafter termed a "latch plate". As here shown, an intermediate portion of said shaft is carried by said latch plate, so that the two end portions of said shaft project from opposite sides thereof, the shaft outer end portion lying on the outer side, and the shaft inner end portion lying on the inner side, of said latch plate. Although the latch plate 32 may be located outside the automobile door 14, it preferably is located inside said door and thereby concealed, as shown, said latch plate being screwed or otherwise suitably secured to the door edge wall section 20, in contact with or alongside the inner surface thereof. By locating said latch plate alongside or closely adjacent the door edge wall section 20, the outer end portion of the shaft 31, and the latch and throw-out arms mounted thereon, are located outside the automobile door, the inner end portion of said shaft being located inside said door. As will hereinafter appear, the shaft 31 is oscillatable about its longitudinal axis, an axis which is substantially horizontal and substantially parallel with the side walls of the automobile door 14. To properly support said shaft for such oscillation, the latch plate 32 is provided with a suitable bearing member 33 for said shaft, said bearing member being of self-lubricating material, if desired, and being either carried directly by the latch plate 32 or, as here shown, by a separate metal plate 34 welded or otherwise suitably secured to said latch plate and lying alongside the inner surface thereof, as clearly shown in Figs. 7, 9, and 11.

Inside the automobile door and suitably mounted on the inner end portion of the shaft 31 is a generally flat plate-like element 35, said element lying alongside the plate member 34 of the latch plate 32 and hence being closely adjacent the door edge wall section 20. If desired and as here shown, said plate member 34 may be provided with suitable spaced bearing projections not only for said element 35 but also, for the detent member to be hereinafter described. As clearly shown in Figs. 7, 9, and 11, the bearing projections 36 for said element 35 are in the form of curved and suitably spaced ribs, whereas the projections 37 for said detent member are in the form of simple and suitably spaced humps. As will be readily understood, the provision of such projections not only reduces the friction produced by the movement of said element and said detent member along such plate member but also, provides suitable lubricant-receiving spaces between said plate member and said element and between said plate member and said detent means.

The bifurcated member 12 (the latch and throw-out arms) and the element 35 are rigidly or otherwise suitably mounted on the shaft 31 for movement as a unit, so that movement of said latch and throw-out arms effects corresponding movement of said element and movement of said element effects corresponding movement of said latch and throw-out arms. Inasmuch as the shaft 31 is oscillatable about its substantially horizontal longitudinal axis, the latch and throw-out arms (the bifurcated member 12) and the element 35 are oscillatable in planes substantially vertical and transversely of the side walls of said door. In other words, the latch and throw-out arms and the element 35 are movable in planes substantially parallel with the general plane of the free edge wall section 20 of the automobile door, the general plane of such door edge wall section being, of course, a substantially vertical plane. Due to the "shut bevel" of the edge walls 21 and 24 of the automobile door and automobile body, a "beveling" relationship made necessary by the outside location of the axes of the door hinges 15, the door edge wall 21 is not truly normal or perpendicular to the side walls 48, 61 of the door, but it is substantially so, as the accompanying drawings indicate.

As will hereinafter more fully appear, the latch and throwout arms 10 and 11 are movable between a single predetermined operative position, shown in Figs. 1 and 27, and an operated position, shown in Figs. 18 and 28. The single predetermined operative position of the latch arm 10 is its door latching position, in which position said arm extends downwardly along the inner side of the keeper pin 18 and effectively and positively maintains the automobile door in latched condition. The operated position of the latch arm is its unlatching position, in which position said arm extends inwardly and downwardly, with no door-latching effect upon the keeper pin 18. The single predetermined operative position of the throw-out arm 11 is what may be termed its potential door throw-out position, a position in which said arm extends downwardly along the outer side of the keeper pin 18, ready for door throw-out or door opening movement. The operated position of said throw-out arm is what may be termed its door thrown-out position, the door having been thrown outwardly by said arm to at least partially open position and said arm being inwardly and downwardly disposed, as clearly shown in Figs. 18 and 28.

In mechanism embodying the present invention, whether the door control provided thereby be a latch control only or a throw-out control only or a combined latch and throw-out control, means is provided for automatically maintaining the door control arm means in its operated position whenever the door with which such mechanism is used is open. Although such maintaining means may be of any suitable nature if the mechanism is to provide a door latch control only, said maintaining means is preferably a power means of one kind or another if the mechanism is to provide a door throw-out control only or a combined door latch and door throw-out control. With mechanism providing door throw-out control only, such power means may also be used to move the throw-out arm from operative position to operated position, to effect automatic throw-out or opening movement of the door with which such mechanism is used, and with mechanism providing combined door latch and door throw-out control, such as is here illustrated, such power means may also be utilized to move the latch arm from operative position to operated position, to effect unlatching of the door with which such mechanism is used, and to move the throw-out arm from operative position to operated position, to effect automatic throw-out or opening movement of such door.

In this first embodiment of the present invention, a generally flat spiral spring 40 is utilized not only as the means for automatically maintaining the latch and throw-out arms in operated position when the automobile door 14 is open, but also, as the means for automatically moving said latch and throw-out arms from operative position to such operated position, when unlatching of the door and opening or throw-out movement thereof are desired. For the accomplishment of those two functions, in this first embodiment of the invention, the spring 40 coacts with or is effective upon the shaft element 35, with the result that the latch and throw-out arms of said shaft are normally urged by said spring toward their operated position. In order to make the efficient accomplishment of the two aforesaid spring functions simple and easy, the shaft element 35 is preferably provided with a cam surface 41 which is constantly engaged by the curved upper end portion 42 of the spring 40, the cam surface of the plate-like element here shown being on the outer edge of a leg portion 43 thereof. The design of the cam surface of said shaft element is important, as said cam surface not only should be of proper shape but also, of sufficient length for the proper inward movement of the latch and throw-out arms to their operated position. For the convenient assembly of parts, the spring 40 is preferably mounted on the latch plate 32, as here shown, the movement of the upper end portion 42 of said spring being in the plane of movement of the shaft element 35, or in other words, in a plane substantially parallel with the general plane of the door edge wall section 20, as will be readily understood. Any suitable means may be utilized in mounting the spring 40 upon the latch plate 32, a simple metal fastening strip 44, secured in an aperture in such latch plate, being here shown for that purpose. Although it is not essential, the latch plate 32 may be, and here is, provided with a suitable guide 45 for the transversely movable upper end portion 42 of the spring 40, the guide here shown (Figs. 8 and 18) being merely a struck out portion of said latch plate.

As will be readily understood, the operated position of the latch and throw-out arms 10 and 11 is determined by the extent of the inward swinging movement of such arms, which in turn is determined by the extent of inward movement of the shaft element 35 with which such arms turn. To yieldingly but effectively limit inward movement of the shaft element 35, when the latch and throw-out arms have been swung inwardly to the desired and predetermined extent, a suitable yieldable abutment, such as the rubber block 46 here shown, is provided for the leg portion 43 of such shaft element. Although any suitable mounting may be utilized for such abutment, the rubber block 46 is here secured to a side flange 47 with which the latch plate 32 is integrally or otherwise suitably provided at its inner side edge, said latch plate side flange extending alongside the inner side wall 48 of the automobile door 14. As clearly shown in Fig. 8, the rubber abutment block 46 is here secured to the latch plate side flange 47 by means of simple tongues 49 punched out of such flange, and to protect such abutment block from the force with which it is struck by the shaft element leg portion 43, under the action of the relatively powerful spring 40, a suitable metal cap 50 may be and preferably is clamped over the face of such block, as here shown.

Although the latch plate guide 45 for the transversely movable upper end portion 42 of the spring 40 may be used as a means for limiting outward movement of such spring portion, a separate limiting means therefor may be utilized, if desired, such as the metal strip 52 here shown, said strip being welded or otherwise suitably secured to the latch plate 32 adjacent its outer side edge, as clearly shown in Figs. 8 and 12. The provision of means for limiting the outward movement of the upper end portion 42 of the spring 40 is not, of course, essential but it is desirable, as such a limiting means effectively prevents undue or excessively inward movement of the free edge of the door 14, in the event that the hereinafter referred to door-engaging bumper members 124 become lost or fail for some reason or another to properly perform their intended function.

When the automobile door 14 is open, the latch and throw-out arms are in their operated position, said arms having been moved to, and being maintained in, such position by the spring or power means 40. During the latter part of the closing movement of said automobile door, the throw-out arm 11 engages the keeper pin 18 on the automobile body, and with said throw-out arm acting somewhat as a crank arm, the final movement of the door to closed position enables said keeper pin and said "crank acting" throw-out arm to bring about the movement of the latch and throw-out arms to their operative position, on opposite sides of said keeper pin, the latch arm being then in its door-latching position and the throw-out arm being then in what has heretofore been termed its door throw-out position, that is, in position to throw the door outwardly to at least partially open position upon the unlatching thereof.

In order to enable the latch and throw-out arms 10 and 11 to be releasably detained in their operative position upon the closing of the door 14, notwithstanding the normal tendency of the power spring 40 to move said arms toward their operated position, mechanism embodying the present invention includes improved detent means for such purpose. In the embodiment of the invention illustrated in Figs. 1 to 22 inclusive, the detent means is a generally flat plate-like member 53, pivotally mounted by the use of a suitable pin 55 on the latch plate 32, alongside the plate member 34 of such latch plate and just above the shaft element 35 with which said detent member cooperates in the releasable detention of the latch and throw-out arms when the door 14 is in closed position.

Although the detent member 54 and the shaft element 35 may be provided with cooperating abutments of any suitable form and location, for such releasable detention of the latch and throw-out arms, such detent member and such shaft element are here provided with cooperating edge abutments or shoulders 56 and 57, respectively. Any suitable means may be utilized to effect detaining cooperation or engagement of such shoulders 56 and 57, upon the movement of the latch and throw-out arms to their operative position. For example, the weight of the detent member 54 may be so distributed that said member has a normal gravitational tendency to turn in a counterclockwise direction, (Fig. 8), to effect detaining cooperation or engagement or its shoulder 56 with the shaft element shoulder 57 upon the closing of the door 14 or, if desired, spring means may be utilized, either with or without gravitational aid, to bring about such a tendency on the part of the detent member to move in a counterclockwise direction. To insure detaining cooperation or engagement of the shoulders 56 and 57 of the detent member 54 and the shaft element 35, whenever the latch and throw-out arms 10 and 11 are moved to their operative position, not only is the weight of said detent member so distributed that said member has a normal gravitational tendency to turn in a counter-clockwise direction (Fig. 8) but also, suitable spring means 58 is utilized to cause said detent member to normally tend to turn in such counter-clockwise direction. As here shown, the spring means 58 is a simple wire spring having its intermediate portion coiled about the pivot pin 55 for the detent member 54 and having its end portions engaging parts of the latch plate 32 and said detent member.

In order to enable engagement and disengagement of the detent member shoulder 56 and the shaft element shoulder 57 to be easily and smoothly effected, said shoulders may be of flat form, (see Fig. 26) with the detent member shoulder 56 the chord W of a circle X of which the detent member pivot pin 55 is the center Y, (the lines Z extending from the center Y to such chord being radii of such circle) and with the shaft element shoulder 57 parallel with the detent member shoulder 56 when such shoulders are in detaining cooperation or engagement; or, as here shown, the shoulders 56 and 57 may be of curved form, with the detent member shoulder 56 the arc of the circle X of which the detent member pivot pin 55 is the center Y, and with the shaft element shoulder 57 parallel with the detent member shoulder 56 when such shoulders are in detaining cooperation or engagement. Notwithstanding the forces tending to maintain the shoulders 56 and 57 in detaining cooperation or engagement when the door 14 is closed, namely, the force of gravity and the force of the spring 58, forces which together normally tend to move the detent member 54 in a counter-clockwise direction, Fig. 8, and the force of the spring 40 which normally tends to move the shaft element 35 in a clockwise direction, Fig. 8, (and which spring 40 must be powerful enough to effect the movement of a relatively heavy automobile door to at least partially open position), disengagement of the shoulders 56 and 57, effected by release actuation or clockwise movement (Fig. 8) of the detent member 54, is extremely easy to accomplish, the pressure of a child's little finger being sufficient, by actual tests, to operate the hereinafter described push button for such release actuation of said detent member.

In the use of mechanism embodying the present invention with the doors of certain structures, such as with the doors of refrigerators, for example, it will probably be sufficient to provide such mechanism with a single manually operable member for the actuation of the detent means of such mechanism to effect the release of the door control arm means thereof, whether that arm means be a latch arm, a throw-out arm or both. In the use of mechanism embodying the present invention with the door of an automobile, however, two manually operable members for such release actuation of the detent means are necessary, namely, an outside manually operable member and an inside manually operable member, so that either a person outside or a person inside said automobile can conveniently effect the unlatching of the automobile door with which said mechanism is used, or the outwardly throwing of such door to at least partially open position, or both. Inasmuch as the accompanying drawings show mechanisms as used with automobile doors, each of such mechanisms includes two manually operable members for the release actuation of the detent means thereof.

Inasmuch as projecting door handles, which even present day automobile door locks still require, are wholly unnecessary with mechanism embodying the present invention, and inasmuch as such handles are dangerous (in that many severe injuries have been caused by them) and are more or less unsightly in appearance (in that they seriously interfere with the proper and the complete streamlining of automobiles), no such handles are used in those embodiments of the invention here illustrated, the manually operable members for the release actuation of the detent means thereof being simple push members, such as push buttons.

For the outside actuation of the detent member 54 of the mechanism illustrated in Figs. 1 to 22 inclusive, a push button 60 is provided, said push button being associated in any suitable manner with the automobile door 14 and being so located that its manual operation can be conveniently effected by a person outside of the automobile of which said door is a part. As here shown, the push button 60 is associated with the sheet metal outer side wall 61 of the door 14, adjacent the free edge wall 21 thereof and just below the level of the pivot pin 55 for the detent member 54. In such a location, the push button 60 is adapted for, and here does have, when manually depressed, direct operative engagement with said detent member, which may be, and here is, provided with a lateral flange 62 or the like, to facilitate such engagement. Inasmuch as said push button engages or contacts with the detent member flange 62 below the pin 55 about which said detent member pivots or swings, manual depression of said push button directly effects clockwise movement of said detent member, (Fig. 8) with consequent release of the shaft element 35 and the latch and throw-out arms 10 and 11 moving therewith, as will be readily understood.

Figure 7:
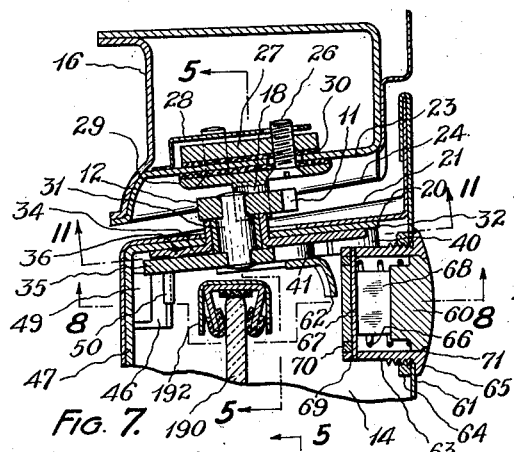
Fig. 7 is a cross-sectional view through portions of the automobile door and body, the door being closed and latched and the view being on the line 7—7, Figs. 5 and 8.

The association of the push button 60 with the door outer side wall 61 is here effected by clamping or otherwise rigidly securing the tubular casing 63 for said push button in a suitable aperture with which said door outer wall is provided, a nut 64 threaded onto said casing cooperating with the laterally flanged outer end 65 thereof in the clamping of the door outer wall therebetween. As clearly shown in Figs. 7 and 8, the push button 60 is not actually connected with the detent member flange 62 but merely engages or contacts therewith when manually operated, at which times an "operative connection" is established between such push button and said detent member. When the push button is in its normal position in said casing, the outer end of said push button is not only substantially flush with the outer end of its casing 63 but also, is substantially flush with the outer wall 61 of the automobile door 14, and any suitable means may be utilized to automatically return the push button to its normal position when manual depression thereof ceases. The means here shown for such purpose is a coiled spring 66, arranged in the push button casing 63 and surrounding the push button therein, the outer end of said spring engaging the headed outer end of said push button and the inner end of said spring engaging a metal cross strip 67 with which said casing is provided, said push button being provided with a suitable transverse slot 68 through which said strip extends. As best shown in Fig. 7, the ends of the strip 67 are mounted in opposed slots 69 with which the said push button casing is provided, and to aid in the guidance and the support of said push button 60 in said casing, an annular member 70 is here shown as suitably mounted in the inner end of said casing, around the push button therein.

By having the outside push button free of actual connection with the detent member, and by providing the spring 66 to automatically return said button to its normal position when manual depression thereof ceases, the outer end of the push button opening in the casing 63 (and hence in the door outer side wall 61) is normally closed by said button, not only when the door is closed but also, when the door is open. As here shown, the outward sliding movement of the push button in its casing is limited by the engagement of the headed outer end of the push button with the laterally flanged outer end 65 of its casing, and by making the engaging portions 71 of such button and casing outer ends of annular and corresponding beveled form, an effective dirt and water-proof seal is provided.

For the inside release actuation of the detent member 54 of the mechanism illustrated in Figs. 1 to 22 inclusive, a push button 74 is provided, said push button being associated in any suitable manner with the automobile door 14 and being so located that its manual operation can be conveniently effected by a person inside the automobile of which said door is a part. As here shown, said inside push button 74 is associated with the inner side wall 48 of the door 14, not adjacent the free edge wall 21 of said door, as is the outside push button 60, but in remotely spaced relationship with said door edge wall, as clearly shown in the accompanying drawings. Direct operative engagement of said inside push button 74 with the detent member 54 cannot, therefore, be effected, so that means must be provided for enabling said "remotely located" inside push button to be operatively connected with said detent member, whenever that is desired.

Although such connecting means may be of any suitable form, the means here shown includes an elongated rockable or oscillatable member, such as a rod 75, one end portion of which has operative connection with the detent member 54, by the means and in the manner hereinafter described, and with the other end portion of which the inside push button 74 has operative connection, as will also hereinafter appear. As clearly indicated in the accompanying drawings, the rod 75 is substantially horizontally disposed and extends along the inner wall 48 of the door 14, so that the longitudinal axis of said rod lies within said door and is substantially parallel with such inner side wall thereof.

In the mechanism illustrated in Figs. 1 to 22 inclusive, a two-fingered member 76 is pivotally mounted on the latch plate 32, for oscillatory movement along the inner surface thereof, the plane of movement of such member being generally vertical and substantially transverse to the side walls of the door 14 or, in other words, in a plane substantially parallel with the general plane of the free edge wall section 20 of such door.

For convenience in assembling mechanism embodying the present invention with a door or a body structure, such as the automobile door 14, the support for the rear end portion of the rod 75, and the means for operatively connecting such rod end portion with the two-fingered member 76, are of such character that simple endwise movement of said rod not only is sufficient to associate or disassociate its rear end portion with the support therefor but also, is sufficient to establish or disestablish operative connection of such rod rear end portion with said two-fingered member.

As here shown, a pin 77, having a socket 78 (see Fig. 6) in the enlarged head thereof, is used as the pivot pin for the two-fingered member 76, and the socket of such pin constitutes the support for the rear end portion of the rod 75, said rod end portion being readily insertable into and being freely removable from such socket by simple endwise movement of said rod. Rigidly or otherwise suitably mounted on the rear end portion of the rod 75, for turning movement about the longitudinal axis of said rod is finger 79, and by simple endwise movement of said rod, the rearwardly bent tip 79' of such finger may be operatively connected with or disconnected from the notched or slotted free end portion of the finger 80 of the two-fingered member 76, the other finger 82 of which member has operative connection at all times with the detent member 54, said detent member being provided with a suitable notch 83 for the reception of such finger 82. The establishment of an operative connection between the fingers 79 and 80 therefore enables an operative connection between the rear end portion of the rod 75 and the detent member 54 to be established, so that when said rod is turned in a counter-clockwise direction, (Fig. 8), by manual depression of the inside push button 74, as will hereinafter appear, clockwise movement of the detent member is effected, with the consequent release of the latch and throw-out arms 10 and 11, as will be readily understood.

If desired and as here shown, the detent member engaging finger 82 of the two-fingered member 76 (which finger is somewhat rearwardly inclined because of the "shut beveling" of the door and body edge walls 21 and 24), may be of involute tooth form, with the side edge walls of the detent member notch 83 of corresponding curvature, a construction which provides a particularly efficient operative connection between said finger and said detent member. To prevent vibration and consequent noise between the rear end portion of the rod 75 and the pivot pin 77, between the fingers 79 and 80, and between the finger 82 and the detent member 54, the use of a wire spring 85 is here shown, the intermediate portion of said spring being coiled about the rear end portion of said rod, adjacent its finger 79. One end portion of said spring is bent laterally around the side edge of said rod finger 79 to a position between said finger and the cooperating finger 80 of member 76, and the other end portion of said spring engages the latch plate side flange 47, all as clearly shown in Fig. 8.

As clearly shown in Figs. 5, 6, and 14, the other or front end portion of the rod 75 is journalled in a suitable supporting bracket 86 screwed or otherwise rigidly secured to the door inner wall 48, the location of said bracket on said door inner wall being such that the disposition of the longitudinal axis of said rod is substantially horizontal. Journalled on and depending from this end portion of said rod is a suitable push button member 87, the inside push button 74 being either the suitably shaped lower end portion thereof or, as here shown, a separate button screwed or otherwise suitably secured thereto. The spaced upper end portions 88 of the sheet metal push button member here shown are journalled on said rod on opposite sides of its supporting bracket 86, with the result that shifting movement of said push button member along said rod is effectively prevented by such bracket. In order to provide access to the push button 74 for the manual depression thereof, from a location inside the automobile of which the door 14 is a part, the inner wall 48 of said door is provided with a suitable aperture 89 for such button, as clearly shown in Fig. 14. Preferably and as here shown, an escutcheon plate 90 is provided for said aperture, said escutcheon plate being secured to said door inner wall, about the margin of said aperture, by the use of any suitable means, such as by the screws 91 and nuts 92 here shown.

To enable the push button member 87, and hence the push button 74 carried thereby, to be operatively connected with the rod 75, upon manual depression of said button, the front end portion of said rod is rigidly or otherwise suitably provided with a lug 93, a shoulder 94 of which is positioned at all times behind said push button member for engagement thereby. Upon manual depression of the push button 74, the push button member 87, the rod lug 93 and the rod 75 all move in a counter-clockwise direction, (Fig. 14), and such movement, through the parts heretofore referred to and described, effects release actuation or clockwise movement of the detent member 54, (Fig. 8), with consequent release of the latch and throw-out arms 10 and 11, as will be readily understood.

Preferably and as here shown, means is provided for normally maintaining the inside push button 74 in the opening of the escutcheon plate 90, and hence substantially flush with the inner wall 48 of the door 14. The means here shown for such purpose is a wire spring 95, carried by the rod-supporting bracket 86 and engaging from behind the push button member 87 so as to normally urge such member in a clockwise direction, (Fig. 14). To limit such clockwise movement of said member 87, when the push button 74 thereof is in such escutcheon plate opening and hence substantially flush with the door inner wall 48, the lower end 96 of such member 87 is bent inwardly, for limiting engagement with the door inner wall 48, as clearly shown in Fig. 14. As a result, there normally is no unclosed and unsightly opening or aperture, due to the use of such button 74, in the inner wall of the door 14, either when the door is closed or when it is open.

In the use of mechanisms embodying the present invention with the door of an automobile, such as in those embodiments of the invention here shown, manually operable inside restraining means is included in each of such mechanisms for preventing undesired release actuation of the detent means thereof.

The manually operable inside restraining means of the mechanism illustrated in Figs. 1 to 22 inclusive includes a bell-crank lever 98 of generally flat plate-like form, said lever being pivoted at 99 on the latch plate side flange 47 for oscillatory pivotal movement alongside the inner surface thereof, in a plane substantially vertical and substantially parallel with the inner wall 48 of the door 14. The rearwardly extending and longitudinally arched lower end portion 100 of said lever constitutes the restraining part thereof, and upon counter-clockwise movement of said lever, (Fig. 5), its restraining part is moved into restraining position, as in Figs. 5, 8, and 9, for example, a position in which such restraining part is between and in engagement with a leg portion 59 of the detent member 54 and the latch plate side flange 47, and in engagement with the latch plate 32.

To provide and insure an effective and positive restraint for the detent member 54 when the restraining lever 98 is in restraining position, the cooperating abutting surfaces of the detent member leg portion 59 and the lever restraining part 100 may, and here do, have the very effective inclination shown (see Fig. 8, for example). The engagement of said lever restraining part with such latch plate effectively limits the movement of the lever in a counter-clockwise direction (Fig. 5) and thus insures the location of its restraining part 100 in restraining position upon such movement of said lever. Upon clockwise movement of said lever, (Fig. 5), its restraining part 100 is moved out of restraining position, as in Fig. 17, for example, the movement of such lever, both clockwise and counter-clockwise, being guided by a suitable guide 101 with which the latch plate side flange is provided, said guide being here shown as a simple struck out portion of such flange.

For effecting oscillatory pivotal movement of the lever 98, to locate its restraining part 100 either in or out of restraining position, a suitable actuator, of push and pull form, is here provided, said actuator having an upper part 102 of rod form and a lower part 103 of flat strip form, the lower end of said rod part being screwed or otherwise suitably secured to the outwardly bent upper end of said strip part. As clearly shown in Figs. 5 and 13, the rod part 102 of said actuator extends through a rubber-grommeted aperture 104 in the inside garnish strip 105 of the automobile door 14, the upper end of such rod part being provided with a suitable hand knob 106 for convenient manipulation by a person inside the automobile of which the door 14 is a part. The strip part 103 of said actuator is slidably mounted on the latch plate side flange 47 for substantially vertical movement along the inner surface thereof, and said latch plate flange is provided with suitable guides 107, 108, and 109, here shown as simple struck out portions thereof, for such strip part. The forwardly extending upper end portion of the restraining lever 98 is pivotally connected at 110 to the upper end portion of the actuator strip part 103, so that upon upward or pulling movement of said actuator, said lever is moved in a clockwise direction, Figs. 5 and 17, with consequent movement of its restraining part 100 out of restraining position, such upward pulling movement of said actuator, and such clockwise movement of said restraining lever, being limited by the engagement of a portion of said lever with the intermediate guide 108 of the latch plate side flange 47. Upon downward or pushing movement of said actuator, the restraining lever 98 is moved in a counter-clockwise direction, Figs. 5 and 17, with consequent movement of its restraining part 100 into restraining position, as will be readily understood.

To yieldingly maintain the actuator strip part in engagement with the latch plate side flange 47, and thereby prevent vibration of such strip part, a flat spring 112 is here provided, said spring being positioned between and in engagement with the outer face of said strip part and the inner faces of the latch plate flange guides 107, 108, and 109. By providing the upper and lower guides 107 and 109 with suitable notches for the outwardly bent end portions 113 of said spring, the escape of said spring is effectively prevented. To releasably and automatically maintain the restraining lever actuator in either its upper or its lower position, with consequent location of the restraining part 100 of such lever out of or in restraining position, a suitable leaf spring 114 is here utilized, the ends of said spring being anchored in suitable pockets with which the upper and lower latch plate flange guides 107 and 109 are provided. The forwardly arched intermediate portion of said spring has cooperative seating engagement with upper and lower notches 115, 116 with which the actuator strip part 103 is provided, and when the arched intermediate portion of said spring 114 is in the upper notch 115, said actuator is releasably held in its lower portion, as in Fig. 5, for example, with consequent maintenance of the restraining lever part 100 in restraining position. When the arched intermediate portion of said spring 114 is in the lower notch 116, however, said actuator is releasably held in its upper position, as in Fig. 17, with consequent maintenance of the lever restraining part 100 out of restraining position. By causing the detent member 54 to be restrained from release actuation when the restraining lever actuator is in its lower position, accidental release movement of said restraining lever is not likely to occur, inasmuch as upward movement of the restraining lever actuator is not likely to be accidentally made. If desired, and as here shown, the actuator strip part 103 may be provided in each of its side edges with notches 115, 116 so that said part may be used with the restraining means of mechanism for a left-side door, as here shown, or with the restraining means of mechanism for a right-side door, as will be readily understood.

The operation of the mechanism constituting this first embodiment of the invention, namely, that mechanism illustrated in Figs. 1 to 22 inclusive and in Figs. 26 to 28 inclusive is as follows:

When the door 14 is closed, which is its position in all of such views with the exception of Figs. 18 and 28, the latch and throw-out arms 10 and 11 are in operative position, being disposed on opposite sides of the keeper pin 18, the latch arm 10 being in latching position, with the consequent latching of the door 14 in such closed position, and the throw-out arm 11 being in throw-out position, that is, in position to effect the automatic throwing of such door to at least partially open position upon the unlatching of said door. The detention of such latch and throw-out arms in their operative position, when the door 14 is closed, is effected by the detent member 54, the shoulder 56 of which has detaining cooperation or engagement at such times with the shoulder 57 of the shaft element 35. As the detent member has a normal tendency to move in a counter-clockwise direction, Figs. 8 and 18, under the influence of gravity and its spring 38, and as the shaft element has a normal tendency to move in a clockwise direction, Figs. 8 and 18, under the influence of the relatively powerful spring 40, detaining cooperation or engagement of the shoulders 56 and 57 is effectively maintained when the door is closed, so that there is no liability of the accidental unlatching of said door due to road shocks or the like.

When it is desired to unlatch said door and automatically effect the throwing of said door to at least partially open position, either the outside push buttons 60 or the inside push button 74 may be manually depressed, and if the restraining part 100 of the inside restraining means is not in restraining position, the depression of either of such push buttons will effect the mechanical actuation of the detent member 54 and the consequent release of the latch and throw-out arms, said arms moving in a clockwise direction (Fig. 18) from operative position to operated position. As the operated position of said latch arm is its unlatching position, the movement of said latch arm to such operated or unlatching position effects, of course, the unlatching of the door 14, and as the operated position of said throw-out arm is its door thrown-out position, the movement of such throw-out arm to its operated or thrown-out position effects, of course, the throwing of said door to at least partially open position.

If such unlatching of the door and its outward throwing movement is desired by a person outside the automobile of which the door 14 is a part, the outside push button 60 of such door is manually depressed, and such depression of said button moves it into direct operative engagement with the flange 62 of the detent member 54, with consequent direct release actuation of said detent member.

If such unlatching of the door and its outward throwing movement is desired by a person inside the automobile of which the door 14 is a part, the inside push button 74 is manually depressed, and such depression of said button effects its operative connection with the front end portion of the oscillatable rod 75, the rear end portion of which is operatively connected at all times with the detent member 54. Specifically, manual depression of the inside push button 74 effects counter-clockwise movement (Figs. 8 and 14) of its carrier member 87, the rod lug 93, the rod 75, the rod finger 79, and the fingers 80 and 82 of the two-fingered member 76, and clockwise release actuation (Fig. 18) of the detent member 54, the finger 82 of such member 76 having operative connection at all times with said detent member.

Due in large part to the character of the co-operating shoulders 56 and 57 of the detent member 54 and the shaft element 35, the shoulder 56 of the detent member being either the chord or the arc of a circle of which the detent member pivot pin 55 is the center and the shoulder 57 of the shaft element 35 being of corresponding form, as heretofore referred to, clockwise release actuation of the detent member is easily effected as the result of manual depression of either of the push buttons 60, 74. As heretofore pointed out, the amount of pressure required for the depression of such buttons is extremely small, the pressure of a child's little finger being, by actual tests, quite sufficient. Due to the provision of the spring 66 effective upon the outside push button 60 and the spring 95 effective upon the inside push button 74, said push buttons are automatically returned to their normal positions when manual depression of such buttons ceases, so that when the door 14 is closed or opened, there normally are no unclosed and unsightly apertures, due to the provision of such push buttons, in either of its side walls.

When the door 14 is open, the latch and throw-out arms 10 and 11 are in their operated position, as shown in Fig. 18 for example, the operated position of the latch arm being its unlatching position and the operated position of the throw-out arm being its door throw-out position. As heretofore pointed out, upon the closing of said door, the throw-out arm 11 strikes the keeper pin 18 on the automobile body 16, and continued closing movement of said door results in the movement of said latch and throw-out arms to their operative position, on opposite sides of the keeper pin 18, the throw-out arm in such co-operation with said keeper pin acting as a "crank arm", as will be readily understood. Upon the closing of the door, therefore, the latch arm 10 is moved to its operative or latching position, with consequent latching of the door in such closed position, and the throw-out arm 11 is moved to its operative or door throw-out position, ready for automatic door throw-out movement when the door is next unlatched. Inasmuch as the shaft element 35 moves with the latch and throw-out arms, the closing of said door also moves said shaft element into cooperative relationship with the detent member 54, the shoulders 56 and 57 of said detent member and said element being thus brought into detaining engagement. Upon the closing of the door 14, therefore, the detent member 54 becomes effective to releasably detain, when the door is closed, the latch and throw-out arms in their operative position. The closing of the door 14 also results in the "loading" of the power spring 40, as the arched upper end portion 42 of said spring is moved to "loaded" position by the leg portion 43 of the shaft element 35 upon the closing of the door, all as will be readily understood.

As shown in Figs. 2, 8, and 18, and in the enlarged views, Figs. 27 and 28, the throw-out arm 11 has a suitable cam 120 on the inner edge of its free end portion, for cooperative engagement with the keeper pin 18 in the movement of the latch and throw-out arms 10 and 11 to operative position upon the closing of the door 14 and for cooperation with such keeper pin in the throwing of such door to at least partially open position upon the unlatching of said door. As will also be noted from an examination of such views, the end of this cam-shaped free end portion of the throw-out arm 11 is disposed beyond the end of the free end portion of the latch arm 10, or in other words, the distance between the terminating point of the free end of the throw-out arm and the longitudinal axis of the shaft 31 about which the latch and throw-out arms swing is somewhat greater than the distance between the terminating point of the free end of the latch arm 10 and such shaft axis.

One of the advantages of such a construction is that the movement of the latch and throw-out arms to their operative position and the consequent latching of the door 14 in closed position can be more easily and more efficiently effected, and another of the advantages thereof is that the outward throwing movement of such door can be more easily and more efficiently effected, with the door being thrown open to a somewhat greater extent, say to six inches or so. As to such first mentioned advantage, it may be pointed out (a) that the inward swinging movement of the latch and throw-out arms need not be of such extent as to horizontally dispose said arms for an operated position thereof, the present latch and throw-out arms when in operated position (Figs. 18 and 28) being angularly disposed, and (b) that the latch arm 10, in moving from operated position to operative position, clears the keeper pin 18 and does not actually engage such pin until such arm is in substantially operative position.

Due to the provision of the door-engaging bumper members 124 with which the automobile body 16 is provided, as clearly shown in Figs. 1 and 3, (which bumper members have a normal but exceedingly limited tendency to move the door 14 in opening direction), the outer edge portion 121 of the latch arm 10 is yieldingly but firmly maintained in latching engagement with the keeper pin 18 when the door is closed, the door being thus positively latched in such closed position as the result of such engagement. As shown in Fig. 27, there is a slight clearance 125 between the cam-shaped inner edge 120 of the throw-out arm 11 and the keeper pin 18, a clearance which is increased if the engagement of the latch arm edge portion 121 and the keeper pin 18 is closer to the free end of such latch arm. If such clearance 125 is too great, a hammering action results, and in order to limit to a predetermined extent the clearance between the keeper pin 18 and the throw-out arm 11 when the door is closed, regardless of whether or not the engagement of the latch arm and the keeper pin is close to or remote from the free end of such latch arm, the construction shown in Fig. 29 may be utilized.

As there shown, the latch arm 10a of the bifurcated member 12a has an outer edge portion 121a which has a curvature corresponding substantially to the opposite part of the cam-forming curvature of the inner edge portion 120a of the throw-out arm 11a, so that when the door 14a is closed, the same extent of clearance is provided between the throw-out arm cam edge portion 120a and the keeper pin 18a, irrespective of the location of the engagement of such keeper pin along the curved outer edge portion 121a of the latch arm 10a, as will be readily understood.

As indicated in Fig. 27, a space 126 is normally provided between the keeper pin 18 and that portion of the bifurcated member 12 at the base or bottom of the opening formed by its latch and throw-out arms 10 and 11, a space which not only permits vertical adjustment of the keeper pin 18 relative to the automobile body 16 to be made but which also, prevents the weight of the door 14 from being supported on said keeper pin, as will be readily understood.

Any suitable means may be utilized in manually pulling from open position to closed position a door with which is used mechanism embodying the present invention. In the embodiment of the invention illustrated in Figs. 1 to 22 inclusive, the door 14 is provided with two such means, as shown in Figs. 2, 19, and 20. One of such means, shown in Figs. 2 and 19, is a finger-receiving pocket member 128 which is screwed or otherwise suitably secured to the door inner wall 48 in any location thereon convenient to a person inside the automobile of which the door 14 is a part. The other means, shown in Figs. 2 and 20, is a finger-engageable plate member 129 which is screwed or otherwise suitably secured to the door inner wall 48 adjacent the door inside garnish strip 105, the top edge portion of such plate member extending upwardly beyond the adjacent edge portion of said garnish strip for convenient finger contact by a person inside the automobile of which said door 14 is a part. Either or both of such means may be provided for a door with which is used the present mechanism, or any other suitable means may be provided for such purpose. For example, a horizontally disposed part of the inside garnish strip of such a door, if said door be an automobile door, may have integrally formed therewith an upstanding ledge or a depression for use in effecting door-closing movement from the inner side of the door, such a ledge or such a depression being, of course, an equivalent form of the plate member 129.

In the use of mechanisms embodying the present invention with the doors of certain structures, such as with the front right-side doors of automobiles, it is desirable to provide the outside push buttons of such mechanisms with key-actuated locks therefor, and in Figs. 23 to 25 inclusive, there is shown a key-actuated lock and push button structure which may be substituted for the outside push button structure of the mechanism heretofore described.

As shown in Figs. 23 to 25 inclusive, the casing 63a of the lock and push button structure here shown is of sufficient size to receive both the push button 60a and the key-actuated lock 130 therefor. As shown, said casing is secured in a suitable aperture in a door outer wall 61a, with a portion of such wall clamped between the laterally flanged outer end portion 65a of said casing and an unthreaded clamping ring 64a which surrounds said casing and is firmly held against said door outer wall by a suitable wedge member 132, extending transversely through said casing, between the push button 60a and the lock 130 therein, and firmly engaging said clamping ring. As indicated in Fig. 25, the push button 60a and its associated parts are of the same construction as the hereinbefore described push button 60 and its associated parts, and such description will not, therefore, be repeated. The key-actuated lock 130 may be a pin tumbler lock, as here shown, or a lock of any other suitable form, and inasmuch as the details of such lock form no part of the present invention, they will not be described. It is sufficient to here point out that said lock is provided at its inner end with a slidable dog 133 which, upon key-actuation of the lock, can be moved back and forth into and out of restraining position behind the push button 60a. The restraining position of such lock dog 133 is shown in dotted lines, Fig. 25, and when said dog is in such position, depression of the push button 60a, and consequent release actuation of the detent member 54, are effectively prevented, as will be readily understood.

As heretofore indicated, several embodiments of the present invention are here illustrated, and one such embodiment, illustrated in Figs. 1 to 22 inclusive (and in Figs. 26 to 28 inclusive), now has been specifically described. Certain modifications of such embodiment, illustrated in Figs. 23 to 25 inclusive and in Fig. 29, also have been specifically described or referred to.

Reference will now be made to other embodiments of the present invention, as illustrated in Figs. 30 and 31, in Figs. 32 to 35 inclusive, in Figs. 36 to 42 inclusive, in Figs. 43 to 46 inclusive, and in Figs. 47 to 49 inclusive. Inasmuch as such other embodiments include certain parts which are also utilized in the embodiment of the invention illustrated in Figs. 1 to 22 inclusive, such parts when numbered at all in the views illustrating such other embodiments, have been given the same reference numerals heretofore assigned to them. Moreover, to avoid needless repetition, such parts will be referred to, if at all, only to the extent necessary for a proper understanding of such other embodiments. When such other embodiments include parts corresponding more or less to parts utilized in the embodiment of the invention illustrated in Figs. 1 to 22 inclusive, corresponding reference numerals have, for the most part, been used.

Referring now to that embodiment of the invention illustrated in Figs. 30 and 31, it will be noted that the latch and throw-out arms 10 and 11 are located inside the automobile door 14b, and for the accomplishment of that result, an intermediate part 136 of the depressed or offset section 20b of the free edge wall 21b of the automobile door 14b is bulged out for the housing of such arms, and for the housing, also, of the free end portion of the keeper pin 18 when said door is in closed position. To enable such free end portion of said keeper pin to enter the chamber or cavity 137 provided by such bulged out door wall part 136, for cooperation with the latch and throw-out arms therein, such bulged out part is provided with a suitable slot 138 for the reception of such keeper pin free end portion, as clearly shown in Figs. 30 and 31. Although such bulged out part 136 is here shown as an integral part of the free edge wall 21b of the door 14b, such part may be, if desired, a separate housing member welded or otherwise suitably secured to such door edge wall, and such housing member will thus become, of course, a part of the free edge wall of the door, as will be readily understood.

In the embodiment of the invention illustrated in Figs. 32 to 35 inclusive, the latch and throw-out arms 10c and 11c are located inside the automobile door 14c, the bifurcated member 12c, of which such arms are integral parts, being mounted on and being movable about a pivot pin 140 rigidly or otherwise suitably secured to the latch plate 32c. As best shown in Fig. 32, said latch plate lies inside the automobile door 14c, alongside or in contact with the inner surface of the rearwardly offset section 20c of its free edge wall 21c, to which wall section said latch plate is screwed, welded or otherwise suitably secured. As shown, the detent member 54 of this embodiment of the invention has direct cooperation with the bifurcated member 12c, the latter member having an upper edge shoulder 57c for detaining cooperation or engagement, when the door 14c is closed, with the shoulder 56 of said detent member. As clearly shown in Figs. 33 and 34, the upper end portion 42 of the power spring 40 has direct engagement with an edge cam 41c of the throw-out arm 11c, so that when the detent member is mechanically actuated in a clockwise direction, as the result of manual depression of either the outside push button or the inside push button of this embodiment of the invention, the bifurcated member 12c is released and the latch and throw-out arms thereof are thereupon moved to their operated position by the spring 40, all as will be readily understood. As will be noted from an examination of Fig. 34, in which view the latch and throw-out arms 10c and 11c are in their operated position, a yieldable abutment is not here utilized to limit the inward or clockwise swing of such arms. In this embodiment of the invention, such inward or clockwise movement of said arms is limited by the direct engagement of the throw-out arm 11c with a substantially rigid abutment, here shown as an outwardly pressed portion 142 of the latch plate side flange 41c, Fig. 34. To provide access for the free end portion of the keeper pin 18 to the latch and throw-out arms 10c and 11c, the free edge portion of the door 14c is provided with a suitable slot 141 for the reception of such keeper pin end portion, as clearly shown in Figs. 32 to 34 inclusive.

In the embodiment of the invention illustrated in Figs. 36 to 42 inclusive, a different type of push and pull actuator is utilized for the bellcrank restraining lever 98d, said actuator being in the form of a simple rod member 145, which may be manually pulled upwardly to move the restraining part 100d of such lever out of restraining position, or manually pushed downwardly to locate said lever restraining part in restraining position. As clearly indicated in Figs. 36 and 39, said actuator rod member extends through a rubber-grommeted aperture in the inside garnish strip 105 of the automobile door 14d, the upper end of said rod member being provided with a suitable hand knob 106 for convenient manipulation by a person inside the automobile of which the door 14d is a part. The lower inwardly turned end of said actuator rod member is suitably secured at 110d in an aperture with which the upper end portion of the restraining lever 98d is provided, and in order to releasably maintain said lever and its actuator rod member in either of the two positions to which they are manually moved, an eccentric type spring 146 is here utilized. As shown in Fig. 36, one end of such spring is suitably secured to the upper end portion of the restraining lever 98d and the other end of said spring is suitably secured to the latch plate side flange 47d, the intermediate portion of said spring being coiled, as is usual. As the construction and the use of such eccentric type springs are well known, no further reference to the one here shown is believed to be necessary.

It will also be noted that in this embodiment of the invention, the inside push button 74 is located above the front end portion of the oscillatable rod 75, with the result that such rod, upon manual depression of such push button, turns in a clockwise direction (Fig. 37) about its substantially horizontal longitudinal axis. In order to enable said rod, upon such clockwise movement thereof, to effect clockwise actuation of the detent member 54d, with consequent release of the latch and throw-out arms 10 and 11, an intermediate member 147 is interposed between the finger 79d of said rod (which finger is rigidly or otherwise suitably mounted on the rear end portion of said rod for turning movement therewith) and the detent member 54d. As clearly shown in Figs. 37 and 40, the intermediate member 147 is pivotally mounted on the latch plate 32d for oscillatory movement about its pivot pin 148, and is provided not only with a suitable notch 149 for the reception of the outer or free end portion of the rod finger 79d but also, with a tooth-shaped finger 150 for the reception of the free end portion of which the detent member 54d is provided with a suitable notch 83d. As a result, there is provided between the rod 75 and the detent member 54d an operative connection of such character that clockwise release actuation of said detent member is effected upon clockwise movement of said rod, all as will be readily understood.

In order to enable an operative connection to be easily and conveniently established between the rod finger 79d and the detent member 54d, in the event that the inside push button 74 is located below the front end portion of the rod 75 (which is the location of such inside push button in the embodiments of the invention heretofore referred to), the detent member 54d is provided with an auxiliary notch 152 for the reception of the outer or free end portion of the rod finger 79d, as clearly shown in Fig. 42. When the inside push button is located below the rod 75, manual depression of the inside push button effects, of course, counter-clockwise movement of such rod, (Fig. 14) and the operative connection of the rod finger 79d with the detent member 54d, by the use of the latter's auxiliary notch 152, (Fig. 42) enables such counter-clockwise movement of said rod to effect clockwise release actuation of said detent member, as will be readily understood.

In this embodiment of the present invention, as best shown in Fig. 40, (and in the embodiments hereinafter referred to), the rear end portion of the rod 75 is removably mounted in a simple aperture 78d in a forwardly offset portion of the latch plate 32d, so that upon endwise movement of said rod, its rear end portion may be readily associated with or freely disassociated from said latch plate, as will be understood.

In the embodiment of the invention illustrated in Figs. 43 to 46, inclusive, a coiled tension spring 155 is utilized, rather than the spiral spring heretofore described, as the means for automatically maintaining the latch and throw-out arms 10 and 11 in their operated position when the door 14e is open and for automatically moving said latch and throw-out arms to their operated position upon release actuation of the detent member 54e. As best shown in Figs. 43 and 44, the lower end of said spring is suitably connected to the shaft element 35e, such as to an integral forwardly extending lug 157 thereof, and the upper end of said spring is suitably connected to the pivot pin 158 for an intermediate member 159 which is here used in operatively connecting the substantially horizontal oscillatable rod 75 with the detent member 54e. As will be readily understood, when the latch and throw-out arms 10 and 11 are releasably detained in their operative position by the detent member 54e, when the door 14e is closed, the spring 155 is under tension, and upon release actuation or clockwise movement of said detent member, such spring is effective to swing said arms to their operated position, with the consequent unlatching of said door and its automatic movement to at least partially open position. Like the spiral spring 40 used with the other embodiments of the present invention, the coiled spring 155 is "loaded" upon the closing of the door 14e. In view of the use of the coiled spring 155 in this embodiment of the invention, the shaft element 35e here shown has a shape or form somewhat different from that of the shaft element 35 heretofore described, but its operation and function are the same as those of the shaft element 35.

By the use of the pivot pin 158, the intermediate member 159 is pivotally mounted on the latch plate 32e, for operative engagement with the detent member 54e, said detent member being provided with a suitable notch 83e for the reception of the tooth-shaped finger 160 of said intermediate member 159, the latter member in turn being provided with a suitable notch 161 for the reception of the finger 79e of the rod 75. An operative connection of said rod and said detent member is thereby established, so that upon clockwise movement (Fig. 44) of said rod about its longitudinal axis, effected by manual depression of the inside push button (not here shown) which is associated with the front end portion of said rod, clockwise release actuation of the detent member 54e is effected, as will be readily understood.

In this embodiment of the invention, a different type of inside restraining means also is utilized, as clearly shown in Figs. 43, 44, and 45. The restraining means therein shown includes a generally flat lever 163, the lower end portion of which is pivoted at 164 to the latch plate side flange 47e and the upper end portion of which is provided with a rearwardly extending restraining part 100e, the side edges of which may be outwardly bent for increased strength and rigidity, if desired and as here shown. Upon pivotal movement of said lever in a clockwise direction, (Fig. 43), its restraining part 100e may be located in restraining position, above the leg portion 59e of the detent member 54e, as shown in full lines, Figs. 43 and 44, and upon pivotal movement of said lever in the opposite or a counter-clockwise direction, its restraining part may be moved out of restraining position, as shown in dotted lines, Fig. 43, such movement of said lever, both clockwise and counter-clockwise, being alongside the latch plate side flange 47e to which it is pivotally connected.

To enable such clockwise and counter-clockwise movement of such restraining lever to be manually effected, by a person inside the automobile of which the door 14e is a part, a suitable actuator for said lever is provided, the stem 165 of the actuator here shown being threaded or otherwise suitably secured to such lever adjacent its upper end portion. Said actuator stem extends inwardly from said lever through a suitable slot 166 in the inner wall 48e of the door 14e, and the inner end of said stem is provided with a suitable knob 167 for convenient manipulation from a location inside such automobile.

To enable the restraining lever 163 to be releasably maintained in either of the two positions to which it is manually moved, positions in which its restraining part 100e is in or out of restraining position, an eccentric type spring 169 is here utilized, said spring having one of its end portions suitably secured to said lever and its other end portion suitably secured to the latch plate side flange 47e, as best shown in Fig. 43. As heretofore pointed out, the construction and use of eccentric type springs are well known, and no further reference to this one is believed to be here necessary.

In the embodiment of the invention illustrated in Figs. 47 to 49 inclusive, a slidable detent means is utilized to releasably detain the latch and throw-out arms 10 and 11 in operative position whenever the automobile door 14f is moved to closed position. The slidable detent means here shown includes a detent member 170 of generally flat, plate-like form, said detent member being mounted on the latch plate 32f for substantially horizontal slidable movement therealong, movement which is transversely of the side walls 48, 61 of the door 14f. For the support and guidance of such detent member, the latch plate 32f is provided with upper and lower guides 171, the lower guide being a struck-out portion of the latch plate 32f and the upper guide being a part of a separate member welded or otherwise suitably secured to such latch plate, as here shown.

As clearly indicated in Fig. 47, the detent member 170 is located just above the shaft element 35f with which it cooperates in the releasable detention of the latch and throw-out arms when the door 14f is closed, said detent member and said shaft element being provided with cooperating shoulders 173, 175 for effecting such detention. As here shown, the shoulder 173 of the detent member is the bottom edge wall of a depending integral extension 177 of such member, the disposition of said shoulder 173 being substantially horizontal and hence substantially parallel with the path of movement of the detent member.

Under the influence of a compression spring 178, the detent member 170 is normally urged outwardly, movement which is limited by the engagement of the shoulder-carrying extension 77 of such detent member with the lower latch plate guide 171. As shown, the relative locations of such detent member extension and such lower latch plate guide are such that the effect of the compression spring 178 is to locate the detent member shoulder 173 in proper position for detaining cooperation or engagement with the shaft element shoulder 175 upon the closing of the door 14f, the movement of said shaft element, during the closing of said door being counter-clockwise, Fig. 47. Although the compression spring 178 may be mounted in any suitable manner and by the use of any suitable means, the end portions of said spring are here supported upon the enlarged heads of pins 179 suitably mounted in lugs 180 and 182, the lug 182 being carried by an outer end portion of the detent member 170 and the lug 180 being carried by the member of which the upper guide 171 is a part. As clearly shown in Figs. 47 and 49, the ends of said spring and said lugs are in abutting relationship.

As in the embodiments of the invention heretofore referred to, manual release actuation or inward movement of the slidable detent member 170, with consequent release of the latch and throw-out arms 10 and 11, may be effected from either the inside or the outside of the automobile of which the door 14f is a part. Although the inside push button for effecting actuation of the detent member 170 from the inside of said automobile is not shown in Figs. 47 to 49 inclusive, the substantially horizontal oscillatable rod 75, with which said push button is associated and the clockwise movement of which it effects when manually depressed, is shown, and that is obviously sufficient for a proper understanding of this particular embodiment of the invention.

As clearly shown in Figs. 47 and 49, the rear end portion of the rod 75 is provided with a suitable finger 79f, for effecting an operative connection of said rod with the detent member 170, said finger being rigidly or otherwise suitably mounted on said rod rear end portion, for turning movement therewith, and said detent member being provided with a suitable notch 181 for the reception of the free end portion of such finger. When the inside push button of the door 14f is manually depressed, clockwise movement of the rod 75 and its finger 79f results, (Fig. 47), with consequent release actuation or inward movement of the slidable detent member 170, and with consequent release of the latch and throw-out arms 10 and 11. Upon their release, the latch and throw-out arms are automatically swung inwardly to operated position, under the action of the power spring 40 which is here effective upon the shaft element 35f, and such inward movement of said arms effects, of course, the unlatching of the door 14f and its automatic movement to at least partially open position.

In this particular embodiment of the invention, the outside push button 60 does not have direct operative engagement, when manually depressed, with the detent member 170, as it does in the other embodiments of the invention here illustrated. As clearly shown in Figs. 47 and 49, a suitable lever 183 is interposed between the outside push button 60 and the nose 184 of the detent member 170, the upper end portion of said lever being pivotally mounted, at 185, on the latch plate 32f. For the convenient actuation of said lever upon manual depression of said outside push button, the lower end portion of said lever is provided with a forwardly extending flange 186 which lies behind said push button and in engagement therewith. Upon the manual depression of said outside push button, the lever 183 is readily swung inwardly or in a clockwise direction (Fig. 47) for the release actuation or inward sliding movement of the detent member 170, the nose 184 of which engages said lever intermediate its ends, as shown.

Inasmuch as the detent member shoulder 173 and the shaft element shoulder 175 are substantially parallel, when in detaining cooperation or engagement, with the path of movement of the slidable detent member 170, the shoulder 173 of such detent member being substantially parallel at all times with such path of movement, engagement and disengagement of such shoulders can be effected by the application of exceedingly slight manual pressure on either the inside or the outside push button, as the power spring 40 offers no undue resistance thereto, as will be readily understood.

As heretofore pointed out, although the present invention is applicable for use with the doors of various structures, such as with the doors of refrigerators and with the doors of buildings of one kind or another, such invention is particularly applicable for use with an automobile door, and in all of the embodiments of the invention here illustrated, such use of the invention is shown. As the accompanying drawings clearly indicate, all of the embodiments of the invention here illustrated are of such character that the mechanisms constituting such embodiments may be easily and conveniently associated with the free edge walls of automobile doors without interfering in any way with the movement of the window panes 190 with which such doors are provided, movement which brings the rear side edges 191 of such panes into close proximity with those sections of the door edge walls with which such mechanisms are associated.

The window panes 190 of the automobile doors here shown have vertical slidable movement in said doors, between upper positions (as shown in Fig. 4), in which positions the window openings of the doors are closed by such window panes, and lower positions (as shown in dash and dot lines, Fig. 4), in which positions the window openings of the doors are exposed or open. As clearly shown in the accompanying drawings, the rear edges 191 of the window panes extend into close proximity with the free edge walls of the automobile doors, and when the window panes of such doors are in lowered position, the rear edges 191 of the window panes extend into close proximity with those sections of the free edge walls of the doors with which are associated the mechanisms embodying the present invention.

For the support and guidance of such window pane side edges 191, the automobile doors here shown are provided, as is usual, with metal channel members 192 for the reception of such window pane edges, said channel members being suitably secured to the free edge walls of such doors and being provided, for the protection of such window pane edges and for the elimination of window pane vibration, with suitable channel-shaped runway strips 193, as is also usual.

As best shown in Figs. 5, 6, 7, 30, 32, 35, 36, and 41, parts of the mechanisms here shown are arranged in the limited spaces between the general planes of the free edge wall sections of the automobile doors with which such mechanisms are used and the substantially parallel planes in which lie the base portions 194 of the channel members 192 for the rear side edges 191 of the window panes 190 of such doors. For example, in the embodiment of the invention illustrated in Figs. 1 to 22 inclusive, all or major portions of the detent member 54, the shaft element 35 and the power spring 40 lie and have movement within such a limited space. The same is true, in whole or in part, as to the other embodiments of the invention here illustrated. Moreover, as best shown in Figs. 6, 13, 14, and 35, in the limited spaces 195, between the inner walls of said doors and the inner walls of the window panes 190 thereof, there are located, for oscillatory or rockable movement about their substantially horizontal longitudinal axes, the elongated members or rods 75, which are used in operatively connecting with the detent means of the present mechanisms the inside push buttons 74 thereof, push buttons which are located in remotely spaced relation with the free edge walls of such doors. It will thus be apparent that the present invention is especially useful with modern automobile doors, such as are here illustrated.

As heretofore referred to, mechanism embodying the present invention may provide a door latch control only, or a door throw-out control only, or a combined door latch and door throw-out control, the latter type of control having been here shown for purposes of illustration and not of limitation. To enable any of the mechanisms here illustrated to provide a door throw-out control only, it is merely necessary to remove from such mechanism the latch arm thereof, which may be easily and quickly accomplished, and such mechanism will then provide a door throw-out control only, as will be readily understood. To enable any of the mechanisms here illustrated to provide a door latch control only, it is merely necessary to substitute for the spiral spring 40 or the coiled tension spring 155 thereof, a spring with insufficient force to effect door throw-out movement, as will also be readily understood. The sole function of such a "light" spring will then merely be the automatic maintenance of the latch and "crank" arms of such a mechanism in operated position when the door, with which such mechanism is used, is open. With the mechanism providing a door latch control only, manual depression of either of the push buttons of such mechanism will effect the release of the latch and crank arms thereof, so that the door with which such mechanism is used need only be provided with a simple and inconspicuous ledge or the like for finger contact in manually effecting the opening of such door, as will be readily understood.

Further objects and advantages of the present invention will be obvious to those skilled in the art to which it relates.

Having described my invention, I claim:

1. In combination with a frame structure and an associated door structure, latch and throw-out control mechanism for said door structure and comprising arm means pivotally associated with one of said structures for cooperation with means associated with the other of said structures in the latching and throw-out control of the door structure, said arm means being movable between a single predetermined operative position and an operated position and being movable to such operative position upon the closing of the door structure, detent means for releasably detaining said arm means in such operative position when the door structure is in closed position, with the consequent latching of said door structure in such closed position, manually operable restraining means movable into and out of restraining position and effective when in restraining position to prevent the release of said arm means from such detention, manually operable means for actuating said detent means when said restraining means is out of restraining position to effect the release of said arm means from such detention, and automatically operable means effective upon said arm means for automatically moving said arm means from its operative position to its operated position upon the release of said arm means from such detention, with the consequent unlatching of said door structure and the consequent automatic movement thereof to at least partially open position.

2. In combination with a frame structure and an associated door structure, latch and throw-out control mechanism for said door structure and comprising arm means pivotally associated with one of said structures for cooperation with means associated with the other of said structures in the latching and throw-out control of the door structure, said arm means being movable between a single predetermined operative position and an operated position and being movable to such operative position upon the closing of the door structure, detent means for releasably detaining said arm means in such operative position when the door structure is in closed position, with the consequent latching of said door structure in such closed position, manually operable restraining means movable into and out of restraining position relative to said detent means and effective when in restraining position to prevent such actuation of said detent means as will effect the release of said arm means from such detention, manually operable means for actuating said detent means when said restraining means is out of restraining position to effect the release of said arm means from such detention, and automatically operable means effective upon said arm means for automatically moving said arm means from its operative position to its operated position upon the release of said arm means from such detention, with the consequent unlatching of said door structure and the consequent automatic movement thereof to at least partially open position.

3. In combination with a frame structure and an associated door structure, latch and throw-out control mechanism for said door structure and comprising arm means pivotally associated with one of said structures for cooperation with means associated with the other of said structures in the latching and throw-out control of the door structure, said arm means being movable between a single predetermined operative position and an operated position and being movable to such operative position upon the closing of the door structure, detent means associated with the structure with which said arm means is associated for releasably detaining said arm means in such operative position when the door structure is in closed position, with the consequent latching of said door structure in such closed position, manually operable means movable into and out of restraining position and effective when in restraining position to prevent the release of said arm means from such detention, two separate and independent manually operable push members associated with the structure with which said detent means is associated and independently operable from opposite sides of such structure for effecting, when said restraining means is out of restraining position, such actuation of said detent means as will effect the release of said arm means from such detention, and automatically operable means effective upon said arm means for automatically moving said arm means from its operative position to its operated position upon the release of said arm means from such detention, with the consequent unlatching of said door structure and the consequent automatic movement thereof to at least partially open position.

4. In combination with a frame structure and an associated door structure, latch and throwout control mechanism for said door structure and comprising arm means pivotally associated with one of said structures for cooperation with means associated with the other of said structures in the latching and throw-out control of the door structure, said arm means being movable between a single predetermined operative position and an operated position and being movable to such operative position upon the closing of the door structure, detent means associated with the structure with which said arm means is associated and being movable transversely of the side walls of the door structure for releasably detaining said arm means in its operative position when the door structure is in closed position, with the consequent latching of the door structure in such closed position, manually operable means associated with the structure with which said detent means is associated for mechanically actuating said detent means when the door structure is closed to effect the release of said arm means from such detention, and automatically operable power means for automatically moving said arm means from its operative position to its operated position upon the release of said arm means from such detention, with the consequent unlatching of said door structure and the consequent automatic movement thereof to at least partially open position, said power means being positioned outside of the confines of said arm means.

5. Latch and throw-out control mechanism for a door of a vehicle body, said door having movably mounted therein a window pane with a portion of the path of movement of one of its edges in close proximity to a portion of an edge wall of said door, said control mechanism comprising arm means pivotally associated with said door and movable transversely of the side walls thereof for cooperation with means associated with said vehicle body in the latching and throw-out control of said door, said arm means being movable between a predetermined operative position and an operated position and being movable to such operative position upon the closing of said door, detent means for releasably detaining said arm means in its operative position when the door is in closed position, with the consequent latching of said door in such closed position, said detent means being associated with said door and having at least a portion movable in the limited space between the general plane of the aforesaid door edge wall portion and a substantially parallel plane in which lies the aforesaid portion of the path of movement of the aforesaid window pane edge, manually operable means associated with said door for actuating said detent means when the door is closed to effect the release of said arm means from such detention, and automatically operable means effective upon said arm means and located out of the aforesaid portion of the path of movement of said window pane edge for automatically moving said arm means from its operative position to its operated position upon the release of said arm means from such detention, with the consequent unlatching of said door and the consequent automatic movement thereof to at least partially open position.

6. Control mechanism for a door of a vehicle body, said door having movably mounted therein a window pane with a portion of the path of movement of one of its edges in close proximity to a portion of an edge wall of said door, said control mechanism comprising arm means pivotally associated with said door and movable transversely of the side walls thereof for cooperation with means associated with said vehicle body in the control of said door, said arm means being movable between a predetermined operative position and an operated position and being movable to such operative position upon the closing of said door, detent means for releasably detaining said arm means in its operative position when the door is closed, said detent means being associated with said door and having at least a portion movable transversely of the side walls of said door in the limited space between the general plane of the aforesaid door edge wall portion and a substantially parallel plane in which lies the aforesaid portion of the path of movement of the aforesaid window pane edge, manually operable means associated with said door for actuating said detent means when the door is closed to effect the release of said arm means from such detention, and automatically operable means separate from and independent of said detent means and located out of the aforesaid portion of the path of movement of the aforesaid window pane edge for automatically maintaining said arm means in its operated position when the door structure is open.

7. Latch and throw-out control mechanism for a door of a vehicle body, said door having movably mounted therein a window pane with a portion of the path of movement of one of its edges in close proximity to a portion of an edge wall of said door, said control mechanism comprising arm means pivotally associated with said door and movable transversely of the side walls thereof for cooperation with means associated with said vehicle body in the latching and throw-out control of said door, said arm means being movable between a predetermined operative position and an operated position and being movable to such operative position upon the closing of said door, detent means for releasably detaining said arm means in its operative position when the door is in closed position, with the consequent latching of said door in such closed position, said detent means being pivotally mounted inside said door and having a detaining portion movable transversely of the side walls of said door in the limited space between the general plane of the aforesaid door edge wall portion and a substantially parallel plane in which lies the aforesaid portion of the path of movement of the aforesaid window pane edge, manually operable means associated with said door for actuating said detent means when the door is closed to effect the release of said arm means from such detention, and automatically operable means effective upon said arm means and located out of the aforesaid portion of the path of movement of the aforesaid window pane edge for automatically moving said arm means from its operative position to its operated position upon the release of said arm means from such detention, with the consequent unlatching of said door and the consequent automatic movement thereof to at least partially open position.

8. Latch and throw-out control mechanism for a door of a vehicle body, said door having movably mounted therein a window pane with a portion of the path of movement of one of its edges in close proximity to a portion of an edge wall of said door, said control mechanism comprising arm means pivotally associated with said door and movable transversely of the side walls thereof for cooperation with means associated with said vehicle body in the latching and throw-out control of said door, said arm means being movable between a predetermined operative position and an operated position and being movable to such operative position upon the closing of said door, detent means for releasably detaining said arm means in its operative position when the door is in closed position, with the consequent latching of said door in such closed position, manually operable means associated with said door for actuating said detent means when the door is closed to effect the release of said arm means from such detention, and automatically operable power means effective upon said arm means for automatically moving said arm means from its operative position to its operated position upon the release of said arm means from such detention, with the consequent unlatching of said door and the consequent automatic movement thereof to at least partially open position, said power means having at least a portion thereof movable in the limited space between the general plane of the aforesaid door edge wall portion and a substantially parallel plane in which lies the aforesaid portion of the path of movement of the aforesaid window pane edge.

9. In combination with a frame structure and an associated door structure, latch and throw-out control mechanism for said door structure and comprising a shaft oscillatably associated with a part of one of said structures and having portions lying on opposite sides of such part, arm means carried by and movable with the shaft portion on one side of such part for cooperation with means associated with the other of said structures in the latching and throw-out control of the door structure, said arm means being movable transversely of the side walls of the door structure between a single predetermined operative position and an operated position and being movable to such operative position upon the closing of the door structure, an element carried by and movable with the shaft portion on the other side of said structure part, detent means associated with the structure with which said shaft is associated for cooperation with said element in releasably detaining said arm means in its operative position when the door structure is in closed position, with the consequent latching of the door structure in such closed position, manually operable means associated with the structure with which said detent means is associated for actuating said detent means when the door structure is closed to effect the release of said arm means from such detention, and automatically operable means for cooperation with said element in automatically moving said arm means from its operative position to its operated position upon the release of said arm means from such detention, with the consequent unlatching of the door structure and the consequent automatic movement thereof to at least partially open position.

10. In combination with a frame structure and an associated door structure, control mechanism for said door structure and comprising a shaft oscillatably associated with a part of one of said structures and having portions lying on opposite sides of such part, arm means carried by and movable with the shaft portion on one side of said structure part for cooperation with means associated with the other of said structures in the control of the door structure, said arm means being movable transversely of the side walls of said door structure between a single predetermined operative position and an operated position and being movable to such operative position upon the closing of the door structure, a plate-like element carried by and movable with the shaft portion on the outher side of said structure part, plate-like detent means associated with the structure with which said shaft is associated for cooperation with said element in releasably detaining said arm means in its operative position when the door structure is closed, manually operable means associated with the structure with which said detent means is associated for actuating said detent means when the door structure is closed to effect the release of said arm means from such detention, and means for maintaining said arm means in its operated position when the door structure is open.

11. In combination with a frame structure and an associated door structure, latch and throw-out control mechanism for said door structure and comprising a shaft oscillatably associated with a part of one of said structures and having portions lying on opposite sides of such part, arm means carried by and movable with the shaft portion on one side of said structure part for cooperation with means associated with the other of said structures in the latching and throw-out control of the door structure, said arm means being movable transversely of the side walls of the door structure between a single predetermined operative position and an operated position and being movable to such operative position upon the closing of the door structure, an element carried by and movable with the shaft portion on the other side of said structure part and having a cam surface, detent means associated with the structure with which said shaft is associated for cooperation with said element in releasably detaining said arm means in operative position when the door structure is in closed position, with the consequent latching of the door structure in such closed position, manually operable means associated with the structure with which said detent means is associated for actuating said detent means when the door structure is closed to effect the release of said arm means from such detention, and automatically operable means for cooperation with the cam surface of said element in automatically moving said arm means from its operative position to its operated position upon the release of said arm means from such detention, with the consequent unlatching of the door structure and the consequent automatic movement thereof to at least partially open position.

12. In combination with a frame structure and an associated door structure, latch and throw-out control mechanism for said door structure and comprising a shaft oscillatably associated with a part of one of said structures and having portions lying on opposite sides of such part, arm means carried by and movable with the shaft portion on one side of said structure part for cooperation with means associated with the other of said structures in the latching and throw-out control of the door structure, said arm means being movable transversely of the side walls of the door structure between a single predetermined operative position and an operated position and being movable to such operative position upon the closing of the door structure, a plate-like element carried by and movable with the shaft portion on the other side of said structure part and having a shouldered edge portion and a cam-shaped edge portion, plate-like detent means associated with the structure with which said shaft is associated and having a shouldered edge portion for cooperation with the shouldered edge portion of said element in releasably detaining said arm means in its operative position when the door structure is in closed position, with the consequent latching of the door structure in such closed position, manually operable means associated with the structure with which said detent means is associated for actuating said detent means when the door structure is closed to effect the release of said arm means from such detention, and automatically operable means associated with the structure with which said shaft is associated for cooperation with the cam-shaped edge portion of said element in automatically moving said arm means from its operative position to its operated position upon the release of said arm means from such detention, with the consequent unlatching of the door structure and the consequent automatic movement thereof to at least partially open position.

13. In combination with a frame structure and an associated door structure, latch and throw-out control mechanism for said door structure and comprising a shaft oscillatably associated with one of said structures and having portions lying inside and outside said structure on opposite sides of an edge wall thereof, arm means carried by and movable with said "outside" shaft portion for cooperation with means associated with the other of said structures in the latching and throw-out control of the door structure, said arm means being movable transversely of the side walls of the door structure between a single predetermined operative position and an operated position and being movable to such operative position upon the closing of the door structure, an element carried by and movable with said "inside" shaft portion, detent means associated with the structure with which said shaft is associated for cooperation with said element in releasably detaining said arm means in its operative position when the door structure is in closed position, with the consequent latching of the door structure in such closed position, manually operable means associated with the structure with which said detent means is associated for actuating said detent means when the door structure is closed to effect the release of said arm means from such detention, and automatically operable means effective upon said arm means for automatically moving said arm means from its operative position to its operated position upon the release of said arm means from such detention, with the consequent unlatching of the door structure and the consequent automatic movement thereof to at least partially open position.

14. In combination with a frame structure and an associated door structure, latch and throw-out control mechanism for said door structure and comprising a shaft oscillatably associated with a part of one of said structures and having portions lying on opposite sides of such part, arm means carried by and movable with the shaft portion on one side of such structure part for cooperation with means associated with the other of said structures in the latching and throw-out control of the door structure, said arm means being movable transversely of the side walls of said door structure between a single predetermined operative position and an operated position and being movable to such operative position upon the closing of the door structure, an element carried by and movable with the shaft portion on the other side of said structure part, detent means associated with the structure with which said shaft is associated for cooperation with said element in releasably detaining said arm means in its operative position when the door structure is in closed position, with the consequent latching of the door structure in such closed position, manually operable means associated with the structure with which said detent means is associated for actuating said detent means when the door structure is closed to effect the release of said arm means from such detention, and automatically operable power means for cooperation with said element in automatically moving said arm means from its operative position to its operated position upon the release of said arm means from such detention, with the consequent unlatching of the door structure and the consequent automatic movement thereof to at least partially open position, said element and said detent means and said power means all lying in substantially the same general plane.

15. Control mechanism for a door of a vehicle body, said door having movably mounted therein a window pane with a portion of the path of movement of one of its edges in close proximity to a portion of an edge wall of said door, said control mechanism comprising a shaft oscillatably associated with a part of said door and having portions lying on opposite sides of said part, arm means carried by and movable with the shaft portion on one side of such door part for cooperation with means associated with the vehicle body in the control of said door, said arm means being movable transversely of the side walls of said door between a single predetermined operative position and an operated position and being movable to such operative position upon the closing of the door, an element carried by and movable with the shaft portion on the other side of such door part, at least a portion of said element being movable in the limited space between the general plane of the aforesaid door edge wall portion and a substantially parallel plane in which lies the aforesaid portion of the path of movement of the aforesaid window pane edge, detent means associated with said door for cooperation with said element in releasably detaining said arm means in its operative position when the door is closed, manually operable means associated with said door for actuating said detent means when the door is closed to effect the release of said arm means from such detention, and automatically operable means located outside of the aforesaid portion of the path of movement of the aforesaid window pane edge for automatically maintaining said arm means in its operated position when the door is open.

16. Latch and throw-out control mechanism for a door of a vehicle body, said door having movably mounted therein a window pane with a portion of the path of movement of one of its edges in close proximity to a portion of an edge wall of said door, said control mechanism comprising a shaft oscillatably associated with a part of said door and having portions lying on opposite sides of such door part, arm means carried by and movable with the shaft portion on one side of such door part for cooperation with means associated with the vehicle body in the latching and throw-out control of said door, said arm means being movable transversely of the side walls of said door between a single predetermined operative position and an operated position and being movable to such operative position upon the closing of the door, an element carried by and movable with the shaft portion on the other side of said door part, detent means associated with said door for cooperation with said element in releasably detaining said arm means in its operative position when the door is in closed position, with the consequent latching of said door in such closed position, manually operable means associated with said door for actuating said detent means when the door is closed to effect the release of said arm means from such detention, and automatically operable power means associated with said door for cooperation with said element in automatically moving said arm means from its operative position to its operated position upon the release of said arm means from such detention, with the consequent unlatching of the door and the consequent automatic movement thereof to at least partially open position, said element and said detent means and said power means each having at least a portion thereof movable in the limited space between the general plane of the aforesaid door edge wall portion and a substantially parallel plane in which lies the aforesaid portion of the path of movement of the aforesaid window pane edge.

17. In combination with door control means and a detent means for the releasable detention thereof, actuating means for said detent means and comprising an elongated rockable member operatively connected with said detent means, a manually operable push member journalled on said elongated member, and means for operatively connecting said push member, upon manual depression thereof, with said elongated member to thereby enable manual depression of said push member to rock said elongated member and thereby effect the actuation of said detent means and the consequent release of said control means from detention by said detent means.

18. In combination with door control means and a detent means for the releasable detention thereof, supporting means, and actuating means for said detent means and comprising an elongated rockable member having one of its end portions journalled in and freely removable from said supporting means, said elongated member when journalled in said supporting means having operative connection with said detent means, and manually operable means for rocking said elongated member to thereby effect the actuation of said detent means and the consequent release of said control means from detention by said detent means.

19. In combination with door control means and a detent means for the releasable detention thereof, supporting means for said control means and said detent means, and actuating means for said detent means and comprising an elongated rockable member having one of its end portions journalled in and freely removable from said supporting means, an element pivotally mounted on said supporting means and having operative engagement with said detent means, said elongated member when journalled in said supporting means having operative connection with said element, and manually operable means for rocking said elongated member to thereby effect the actuation of said detent means and the consequent release of said control means from detention by said detent means.

20. Control mechanism for a door of a vehicle body, said door having a window pane movably mounted therein, said control mechanism comprising arm means pivotally associated with said door for cooperation with means associated with said vehicle body in the control of said door, said arm means being movable transversely of the side walls of said door between a predetermined operative position and an operated position and being movable to such operative position upon the closing of the door, detent means associated with said door for releasably detaining said arm means in its operative position when the door is in closed position, means for actuating said detent means when the door is closed to effect the release of said arm means from such detention, and means for maintaining said arm means in its operated position when the door is open, said actuating means having a manually operable member and an elongated rockable member for use in operatively connecting said manually operable member with said detent means, said manually operable member being associated with said door in spaced relation to an edge wall thereof for manual operation from one side of said door and said elongated member being rockable transversely of its generally horizontal longitudinal axis and having at least its major part lying between a side wall of said door and a side wall of said window pane when said pane is in at least one of its positions of movement in said door.

21. Latch and throw-out control mechanism for a door of a vehicle body, said door having movably mounted therein a window pane with a portion of the path of movement of one of its edges in close proximity to a portion of an edge wall of said door, said control mechanism comprising arm means pivotally associated with said door for cooperation with means associated with said vehicle body in the latching and throw-out control of said door, said arm means being movable between a single predetermined operative position and an operated position and being movable to such operative position upon the closing of said door, such movement of said arm means being transversely of the side walls of said door and in the limited space between the general plane of the aforesaid door edge wall portion and a substantially parallel plane in which lies the aforesaid portion of the path of movement of the window pane edge, detent means for releasably detaining said arm means in its operative position when the door is in closed position, with the consequent latching of said door in such closed position, manually operable means associated with said door for actuating said detent means when the door is in closed position to effect the release of said arm means from such detention, and automatically operable means effective upon said arm means and located out of the aforesaid portion of the path of movement of the aforesaid window pane edge for automatically moving said arm means from its operative position to its operated position upon the release of said arm means from such detention, with the consequent unlatching of the door and the consequent automatic movement thereof to at least partially open position.

22. Control mechanism for a door of a vehicle body, said door having movably mounted therein a window pane with a portion of the path of movement of one of its edges in close proximity to a portion of an edge wall of said door, said control mechanism comprising arm means pivotally associated with said door for cooperation with means associated with said vehicle body in the control of said door, said arm means being movable transversely of the side walls of the door between a predetermined operative position and an operated position and being movable to such operative position upon the closing of said door, detent means associated with said door for releasably detaining said arm means in its operative position when the door is in closed position, said arm means and said detent means each having a portion thereof movable in the limited space between the general plane of the aforesaid door edge wall portion and a substantially parallel plane in which lies the aforesaid portion of the path of movement of the aforesaid window pane edge, manually operable means associated with said door for actuating said detent means when the door is in closed position to effect the release of said arm means from such detention, and means separate from and independent of said detent means and located out of the aforesaid portion of the path of movement of the aforesaid window pane edge for maintaining said arm means in its operated position when the door is open.

23. Latch and throw-out control mechanism for a door of a vehicle body, said door having movably mounted therein a window pane with a portion of the path of movement of one of its edges in close proximity to a portion of an edge wall of said door, said control mechanism comprising arm means pivotally associated with said door for cooperation with means associated with said vehicle body in the latching and throw-out control of said door, said arm means being movable transversely of the side walls of the door between a predetermined operative position and an operated position and being movable to such operative position upon the closing of said door, detent means associated with said door for releasably detaining said arm means in its operative position when the door is in closed position, with the consequent latching of the door in such closed position, manually operable means associated with said door for actuating said detent means when the door is in closed position to effect the release of said arm means from such detention, and automatically operable power means for automatically moving said arm means from its operative position to its operated position upon the release of said arm means from such detention, with the consequent unlatching of the door and the consequent automatic movement thereof to at least partially open position, said arm means and said detent means and said power means each having a portion thereof movable in the limited space between the general plane of the aforesaid door edge wall portion and a substantially parallel plane in which lies the aforesaid portion of the path of movement of the aforesaid window pane edge.

24. In combination with a frame structure and an associated door structure, control mechanism for said door structure and comprising arm means pivotally associated with one of said structures for cooperation with means associated with the other of said structures in the control of the door structure, said arm means being movable between an operative position and an operated position and being movable to such operative position upon the closing of the door structure, detent means associated with the structure with which said arm means is associated for releasably detaining said arm means in its operative position when the door structure is closed, manually operable restraining means associated with the structure with which said detent means is associated and being movable into and out of restraining position relative to said detent means, said restraining means when in restraining position being in engagement with a rigid part of the structure with which it is associated and lying between such rigid structure part and said detent means, with the result that said restraining means provides, when in restraining position, a substantial and effective restraint to such actuation of said detent means as will effect the release of said arm means from detention by said detent means, manually operable means for actuating said detent means when the restraining means is out of restraining position so as to effect the release of said arm means from such detention, and means for maintaining said arm means in its operated position when the door structure is open.

25. In combination with a frame structure and an associated door structure, control mechanism for said door structure and comprising a support rigidly associated with one of said structures and having a substantially rigid extension, arm means pivotally associated with said support for cooperation with means associated with the other of said structures in the control of the door structure, said arm means being movable between an operative position and an operated position and being movable to such operative position upon the closing of the door structure, detent means associated with said support for releasably detaining said arm means in its operative position when the door structure is closed, restraining means associated with the extension of said support and being movable into and out of restraining position relative to said detent means, said restraining means when in restraining position being in engagement with said extension and lying between such extension and said detent means, with the result that said restraining means provides, when in restraining position, a substantial and effective restraint to such actuation of said detent means as will effect the release of said arm means from detention by said detent means, manually operable means for actuating said detent means when said restraining means is out of restraining position so as to effect the release of said arm means from such detention, and means for maintaining said arm means in its operated position when the door structure is open.

26. In combination with a frame structure and an associated door structure, control mechanism for said door structure and comprising supporting means associated with one of said structures, said supporting means having a part associated with an edge wall of such structure and a part associated with a side wall of such structure, arm means pivotally associated with said "edge wall" part for cooperation with means associated with the other of said structures in the control of the door structure, said arm means being movable transversely of the side walls of the door structure between a predetermined operative position and an operated position, said arm means having a normal tendency to move to its operated position and being movable to its operative position upon the closing of the door structure, detent means associated with said "edge wall" part for releasably detaining said arm means in its operative position when the door structure is in closed position, manually operable restraining means associated with said "side wall" part and movable into and out of restraining position relative to said detent means, said restraining means being effective when in its restraining position to prevent such actuation of said detent means as will effect the release of said arm means from such detention, and manually operable means for actuating said detent means when said restraining means is out of restraining position so as to effect the release of said arm means from such detention.

27. Latch and throw-out control mechanism for a door of a vehicle body, said door having movably mounted therein a window pane with a portion of the path of movement of one of its edges in close proximity to a portion of an edge wall of said door, said control mechanism comprising arm means pivotally associated with said door and movable transversely of the side walls thereof for cooperation with means associated with said vehicle body in the latching and throw-out control of said door, said arm means being movable between a predetermined operative position and an operated position and being movable to such operative position upon the closing of said door, detent means for releasably detaining said arm means in its operative position when the door is in closed position, with the consequent latching of said door in such closed position, manually operable means associated with said door for actuating said detent means when the door is closed to effect the release of said arm means from such detention, and automatically operable power means effective upon said arm means for automatically moving said arm means from its operative position to its operated position upon the release of said arm means from such detention, with the consequent unlatching of said door and the consequent automatic movement thereof to at least partially open position, said detent means and said power means each having a portion thereof movable in the limited space between the general plane of the aforesaid door edge wall portion and a substantially parallel plane in which lies the aforesaid portion of the path of movement of the aforesaid window pane edge.

RUDOLPH I. SCHONITZER.